US008850900B2

(12) United States Patent
Isono et al.

(10) Patent No.: US 8,850,900 B2
(45) Date of Patent: Oct. 7, 2014

(54) OPERATION AMOUNT DETECTION APPARATUS

(75) Inventors: Hiroshi Isono, Mishima (JP); Noboru Fujiwara, Aichi-gun (JP); Hirofumi Otsuka, Tomi (JP)

(73) Assignees: Toyota Jidosha Kabushiki Kaisha, Toyota-shi (JP); Minebea Co., Ltd., Kitasaku-gun (JP)

( * ) Notice: Subject to any disclaimer, the term of this patent is extended or adjusted under 35 U.S.C. 154(b) by 291 days.

(21) Appl. No.: 13/518,742

(22) PCT Filed: Dec. 21, 2010

(86) PCT No.: PCT/IB2010/003326
§ 371 (c)(1),
(2), (4) Date: Jun. 22, 2012

(87) PCT Pub. No.: WO2011/077231
PCT Pub. Date: Jun. 30, 2011

(65) Prior Publication Data
US 2012/0255372 A1    Oct. 11, 2012

(30) Foreign Application Priority Data

Dec. 22, 2009 (JP) ................................. 2009-291466

(51) Int. Cl.
| | |
|---|---|
| *G01L 1/04* | (2006.01) |
| *B60T 7/04* | (2006.01) |
| *G05G 1/46* | (2008.04) |
| *B60T 11/18* | (2006.01) |
| *G01L 5/00* | (2006.01) |
| *G01L 5/22* | (2006.01) |

(52) U.S. Cl.
CPC ................. *B60T 11/18* (2013.01); *B60T 7/042* (2013.01); *G05G 1/46* (2013.01); *G01L 1/04* (2013.01); *G01L 5/0038* (2013.01); *G01L 5/225* (2013.01)
USPC .................................................. 73/862.621

(58) Field of Classification Search
CPC .......... G01L 5/0038; G01L 1/04; G01L 1/205
USPC ...................................................... 73/862.621
See application file for complete search history.

(56) References Cited

U.S. PATENT DOCUMENTS 5,383,718 A * 1/1995 Burgdorf et al. ............ 303/113.2
8,215,226 B2 * 7/2012 Watanabe ...................... 91/369.2
(Continued)

FOREIGN PATENT DOCUMENTS

| EP | 1 557 653 | 7/2005 |
|---|---|---|
| EP | 1 980 832 | 10/2008 |

(Continued)

OTHER PUBLICATIONS

Japanese Office Action Issued Oct. 17, 2011 in JP Patent Application No. 2009-291466 filed Dec. 22, 2009 (with partial English translation).

(Continued)

*Primary Examiner* — Hezron E Williams
*Assistant Examiner* — Rodney T Frank
(74) *Attorney, Agent, or Firm* — Oblon, Spivak, McClelland, Maier & Neustadt, L.L.P.

(57) ABSTRACT

An operation amount detection apparatus includes a transmission member that transmits a load corresponding to an operation amount between a shaft portion and an operation target member through connecting portions that connect a first support portion supported by the operation target member and a second support portion supported by the shaft portion, and a detection device that detects an operation amount based on an amount of deformation of the connecting portions. A plurality of the connecting portions are provided in parallel between the first support portion and the second support portion, and deflect due to transmission of a load so that the first support portion and the second support are relatively displaced in a direction of a linear motion. The respective connecting portions are mutually opposed in a direction perpendicular to a lengthwise direction of the shaft portion.

17 Claims, 14 Drawing Sheets

(56) References Cited

U.S. PATENT DOCUMENTS

| | | |
|---|---|---|
| 2002/0014379 A1* | 2/2002 | Oka et al. .............. 188/151 R |
| 2006/0162434 A1 | 7/2006 | Saito et al. |
| 2008/0250874 A1 | 10/2008 | Fujiwara et al. |
| 2008/0307920 A1 | 12/2008 | Fujiwara |
| 2010/0095755 A1 | 4/2010 | Isono |

FOREIGN PATENT DOCUMENTS

| | | |
|---|---|---|
| EP | 2 003 434 | 12/2008 |
| EP | 2 123 527 | 11/2009 |
| JP | 50 8345 | 1/1975 |
| JP | 52 110870 | 8/1977 |
| JP | 2000 103325 | 4/2000 |
| JP | 2000 198429 | 7/2000 |
| JP | 2001 334919 | 12/2001 |
| JP | 2002 205628 | 7/2002 |
| JP | 2007 131230 | 5/2007 |
| JP | 2008-309585 | 12/2008 |
| WO | 2010 064304 | 6/2010 |

OTHER PUBLICATIONS

International Search Report Issued May 12, 2011 in PCT/IB10/03326 Filed Dec. 21, 2010.

* cited by examiner

CROSS-SECTIONAL VIEW TAKEN ALONG LINE 2A-2A

CROSS-SECTIONAL VIEW TAKEN ALONG LINE 3B-3B

CROSS-SECTIONAL VIEW TAKEN ALONG LINE 4B-4B

CROSS-SECTIONAL VIEW TAKEN ALONG LINE 5B-5B

CROSS-SECTIONAL VIEW TAKEN ALONG LINE 7B-7B

CROSS-SECTIONAL VIEW TAKEN ALONG LINE 8B-8B

CROSS-SECTIONAL VIEW TAKEN ALONG LINE 9B-9B

CROSS-SECTIONAL VIEW TAKEN ALONG LINE 10B-10B

CROSS-SECTIONAL VIEW TAKEN ALONG LINE 11B-11B

CROSS-SECTIONAL VIEW TAKEN ALONG LINE 12B-12B

CROSS-SECTIONAL VIEW TAKEN ALONG LINE 13B-13B

CROSS-SECTIONAL VIEW TAKEN ALONG LINE 14B-14B

OPERATION AMOUNT DETECTION APPARATUS

BACKGROUND OF THE INVENTION

1. Field of the Invention

The invention relates to an operation amount detection apparatus.

2. Description of the Related Art

An operation amount detection apparatus is available in the related art that detects an operation amount based on an amount of deformation of a transmission member that transmits a load corresponding to an operation amount between an operation member such as a pedal and an operation target member.

For example, Japanese Patent Application Publication No. 2000-103325 (JP-A-2000-103325) discloses an operation amount detection apparatus provided with a base member that transmits a brake operating force, a booster-side operating rod that receives the operating force, and a rod-like member connected to the base member and the booster-side operating rod. In this operation amount detection apparatus, a technology is disclosed in which, in the case an operating force is applied, strain caused by bending generated in the rod-like member is measured by a strain gauge, and that measured value is detected as corresponding to operating force.

Here, from the viewpoint of improving detection accuracy of an operation amount, it is desirable that the amount of deformation of the transmission member is large relative to the load that acts on the transmission member. However, when the amount of deformation of the transmission member is attempted to be increased while maintaining the strength thereof, there is the problem of this causing the transmission member to become excessively large.

SUMMARY OF THE INVENTION

The invention provides an operation amount detection apparatus capable of both securing strength of a transmission member that transmits a load corresponding to an operation amount and inhibiting the transmission member from becoming excessively large.

In a first aspect of the invention, an operation amount detection apparatus that detects an operation amount transmitted from a shaft portion rotatably supported and extending in a radial direction of the rotation to an operation target member to which rotational motion of the shaft portion is input after being converted to a linear motion, between an operation member having the shaft portion and the operation target member, includes: a transmission member that includes a first support portion that is supported by the operation target member, a second support portion that is arranged at a different location in a lengthwise direction of the shaft portion from the first support portion and is supported by the shaft portion, and a plurality of connecting portions that connect the first support portion and the second support portion, are arranged in parallel between the first support portion and the second support portion, deflect due to transmission of a load so that the first support portion and the second support portion are relatively displaced in a direction of the linear motion, and are mutually opposed in a direction that is perpendicular to the lengthwise direction of the shaft portion, wherein the transmission member transmits a load corresponding to the operation amount between the shaft portion and the operation target member through the connecting portions; and a detection device that detects the operation amount based on an amount of deformation of the connecting portions caused by transmission of the load.

In the above configuration, the plurality of connecting portions may be arranged on one side and the other side in the direction of the linear motion of the first support portion and the second support portion, and the connecting portion arranged on one side of the linear motion and the connecting portion arranged on the other side of the linear motion may be formed to have a shape such that amounts of deformation thereof per unit transmitted load are equal to each other.

In the above configuration, the first support portion and the second support portion may be formed of a pair of plate members opposing each other in an axial direction of the rotation so as to interpose the shaft portion, the pair of plate members may be formed to have U-shaped cross-sections mutually connected at one end portion in the direction of the linear motion, and the connecting portions may connect the first support portion and the second support portion at both ends respectively in the direction of the linear motion.

In a second aspect of the invention, an operation amount detection apparatus detects an operation amount transmitted from a shaft portion rotatably supported and extending in a radial direction of the rotation to an operation target member to which rotational motion of the shaft portion is input after being converted to a linear motion, between an operation member having the shaft portion and the operation target member, includes: a transmission member that includes a first support portion that is supported by the operation target member, a second support portion that is supported by the shaft portion, and connecting portions that connect the first support portion and the second support portion, are connected in series on a load transmission path between the first support portion and the second support portion, have a plurality of curved and connected constituent portions, and deflect due to transmission of a load so that the first support portion and the second support portion are relatively displaced in a direction of the linear motion, wherein the transmission member transmits a load corresponding to the operation amount between the shaft portion and the operation target member through the connecting portions; and a detection device that detects the operation amount based on an amount of deformation of the connecting portions caused by transmission of the load.

In the above configuration, the connecting portions may have a pair of the constituent portions in mutual opposition in the direction of the linear motion.

In the above configuration, the connecting portions may be formed into a U shape that protrudes in a direction moving away from the first support portion and the second support portion in a lengthwise direction of the shaft portion, and the constituent portion connected to the first support portion and the constituent portion connected to the second support portion may be mutually opposed in the direction of the linear motion.

In the above configuration, the connecting portions may be respectively provided on both sides in the lengthwise direction of the shaft portion with the first support portion and the second support portion interposed therebetween, a plurality of the detection devices may be provided along the lengthwise direction of the shaft portion for the constituent portions connected to the first support portion in each of the connecting portions, and end portions on the opposite side from the first support portion of the constituent portions provided with the detection devices may be mutually connected by a member different from the constituent portions.

In the above configuration, the pair of constituent portions may be mutually connected by both end constituent portions that extend in the lengthwise direction of the shaft portion and are the constituent portions that extend in the direction of the linear motion at the both ends, the first support portion may be connected to a central portion of one of the pair of constituent portions in the lengthwise direction of the shaft portion, and the second support portion may be connected to a central portion of the other of the pair of constituent portions in the lengthwise direction of the shaft portion.

In the above configuration, the connecting portions may have a turnaround portion that is turned around from one portion to another portion in a direction perpendicular to the direction of the linear motion.

In the above configuration, the connecting portions may have a detection portion constituent portion that is connected to the first support portion, extends in the lengthwise direction of the shaft portion, and is the constituent portion provided with the detection apparatus, and a turnaround portion constituent portion that connects the detection portion constituent portion and the second support portion in the direction of the linear motion and is the constituent portion provided with the turnaround portion, and the turnaround portion may be curved towards the first support portion in the lengthwise direction of the shaft portion.

In the above configuration, the pair of constituent portions may be mutually connected by both end constituent portions that extend in the lengthwise direction of the shaft portion and are the constituent portions that extend in the direction of the linear motion at the both ends, the first support portion may be connected to one of the pair of constituent portions, the second support portion may be connected to the other of the pair of constituent portions, and the turnaround portion may be provided in the both end constituent portions.

In the above configuration, the detection device may be provided in a prescribed constituent portion that is the constituent portion extending in a direction perpendicular to the direction of the linear motion, the first support portion and the second support portion may be respectively supported by the shaft portion and operation target member so that a moment that causes curvature in mutually different directions on one side and the other side in the perpendicular direction of the prescribed constituent portion acts due to the transmission of a load, and the detection device may detect the operation amount based on respective amounts of deformation on one side and the other side in the perpendicular direction of the prescribed constituent portion.

In the above configuration, the prescribed constituent portion may be a detection portion constituent portion that is connected to the first support portion, extends in the lengthwise direction of the shaft portion, and is the constituent portion provided with the detection device, an end portion of the detection portion constituent portion on the opposite side from the side where the first support portion is connected may be connected to the second support portion through the constituent portion that differs from the detection portion constituent portion, and the second support portion may be arranged closer to the side of the first support portion in the lengthwise direction of the shaft portion than the end portion of the detection portion constituent portion on the opposite side from the side where the first support portion is connected.

In the above configuration, the shaft portion may have a U-shaped cross-section that is perpendicular to the lengthwise direction, and the transmission member may be arranged in a space inside the U shape.

In the above configuration, when deflection in which the relative displacement becomes a prescribed amount occurs in the connecting portions, the connecting portions may further transmit a load without going through the transmission member by causing the shaft portion side and the operation target member side to make contact.

The operation amount detection apparatus in an aspect of the invention has a connecting portion that connects a first support portion supported by an operation target member and a second support portion supported by a shaft portion. The first support portion and the second support portion are arranged at different locations in the lengthwise direction of the shaft portion. A plurality of connecting portions are provided in parallel between the first support portion and the second support portion, and deflect by transmission of a load so that the first support portion and the second support are relatively displaced. Each connecting portion is mutually opposed in a direction perpendicular to the lengthwise direction of the shaft portion. As a result, a load that acts on each of the connecting portions after being dispersed decreases, thereby making it possible to reduce strength and increase the amount of deflection of the connecting portions. Accordingly, the effect is demonstrated by which securing of strength for the transmission member and inhibiting excessive increases in size of the transmission member can both be realized.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
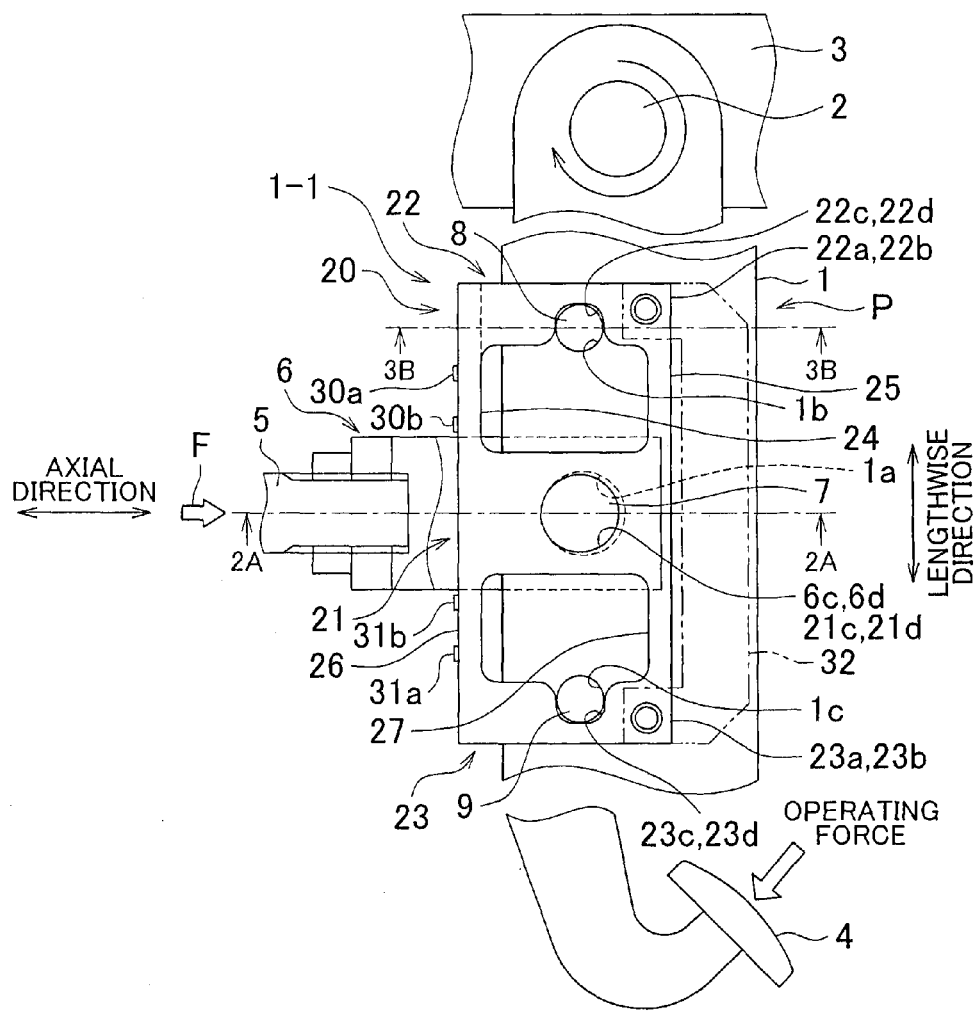
FIG. 1 is front view of an essential portion showing an operation amount detection apparatus relating to a first example.

The following provides a detailed explanation of examples of the operation amount detection apparatus relating to the invention while referring to the drawings. Furthermore, the invention is not intended to be limited by these examples. In addition, constituents in the following examples include those that can be easily presumed by a person with ordinary skill in the art or which are substantially identical thereto.

FIRST EXAMPLE

Figure 2:
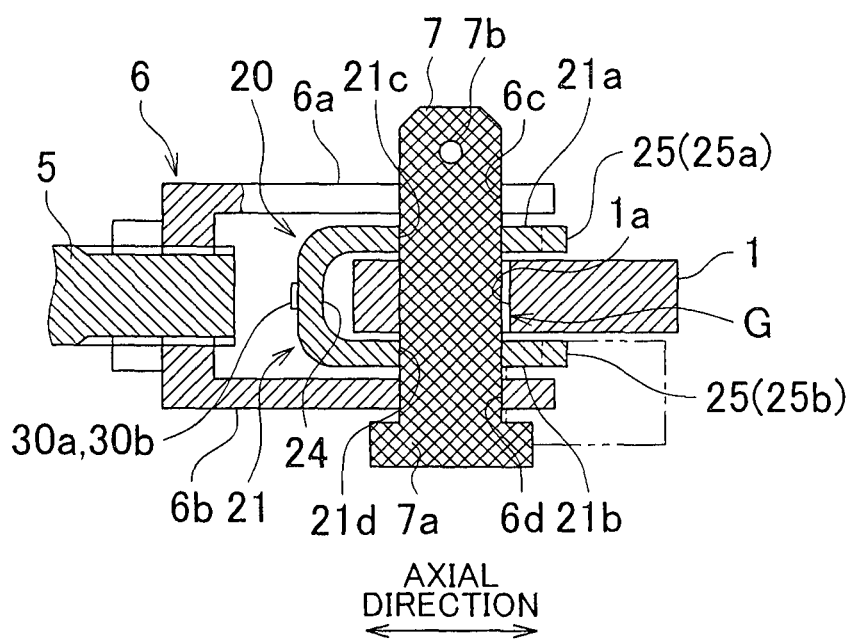
FIG. 2 is a cross-sectional view showing the structure of a first support portion of a first example.
Figure 3:
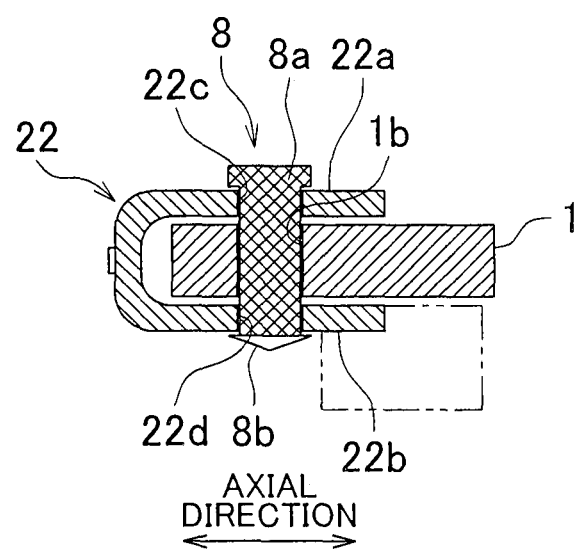
FIG. 3 is a cross-sectional view showing the structure of a second support portion of a first example.

The following provides an explanation of a first example with reference to FIGS. 1 to 3. The first example relates to an operation amount detection apparatus that detects an operation amount transmitted from an operation member to an operation target member. FIG. 1 is a front view of an essential portion in which a portion representing the operation amount detection apparatus relating to the first example of the invention has been cut away. FIG. 2 is a cross-sectional view taken along line 2A-2A of FIG. 1 showing the structure of a first support portion of the operation amount detection apparatus of the first example, and FIG. 3 is a cross-sectional view taken along line 3B-3B of FIG. 1 showing the structure of a second support portion of the operation amount detection apparatus of the first example.

A pedal arm (shaft portion) 1 of a brake pedal (operation member) P provided in a vehicle not shown is shown in FIG. 1. A rotating shaft 2, which is provided on one end in the lengthwise direction of the pedal arm 1, is rotatably supported by a pedal support 3 fixed to the vehicle not shown. In other words, the pedal arm 1 is rotatably supported by using a central axial line of the rotating shaft 2 as the center of rotation, and extends in the radial direction of rotation. A pedal 4 able to be stepped on by a passenger is installed on the other end in the lengthwise direction of the pedal arm 1.

An input rod 5 is shown in FIG. 1. The input rod 5 extends in the lengthwise direction of the pedal arm 1 and in a direction perpendicular to the axial direction of the rotating shaft 2. A distal end portion of the input rod 5 is coupled to a master cylinder and brake booster not shown that are used as operation target members that control operation of a braking apparatus not shown. A proximal end portion of the input rod 5 is fixed to a crevice 6. The crevice 6 and the input rod 5 move as a single unit in the axial direction of the input rod 5 (linear motion). Furthermore, in the following explanations, "axial direction" indicates a direction that is the axial direction of the input rod 5 and the direction in which the input rod 5 demonstrates linear motion unless specifically indicated otherwise. The crevice 6 converts rotational motion of the pedal arm 1 to linear motion. Linear motion converted by the crevice 6 is input to the master cylinder and the brake pedal through the input rod 5.

The pedal arm 1 is provided with an operation amount detection apparatus 1-1 that detects an operation amount (such as an operating force or stroke) that is transmitted from the pedal arm 1 to the operation target member between the pedal arm 1 and the operation target member. The operation amount detection apparatus 1-1 connects the pedal arm 1 and the operation target member. The operation amount detection apparatus 1-1 has a transmission member 20, which transmits an operation amount from the pedal arm 1 to the operation target member, and strain sensors 30 (30a, 30b) and 31 (31a, 31b) used as sensors that detect an amount of deformation of the transmission member 20. The transmission member 20 has a first support portion 21, second support portions 22 and 23, and connecting portions 24 and 25. The first support portion 21 is supplied by the operation target member. The second support portions 22 and 23 are arranged at different locations in the lengthwise direction of the pedal arm 1 from the first support portion 21 and are supported by the pedal arm 1. The connecting portions 24 and 25 connect the first support portion 21 and the second support portions 22 and 23. The transmission member 20 transmits a load corresponding to an operation amount between the pedal arm 1 and the operation target member through the connecting portions 24 and 25. Furthermore, the operation target member is a member to which an operation amount is transmitted from the pedal arm 1 through the transmission member 20, and includes not only the master cylinder and brake booster, but also a connecting shaft 7 to be described later, the crevice 6 and the input rod 5.

As shown in FIG. 2, the first support portion 21 is a plate member formed to have a U-shaped cross-section, and a pair of mutually opposing plate portions 21a and 21b that interpose the pedal arm 1 in the direction of plate thickness (axial direction of rotation) are connected at an end portion on the side of the input rod 5 in the axial direction. The pedal arm 1 is a plate member. The plate portions 21a and 21b of the first support portion 21 are arranged on one side and the other side in the direction of plate thickness of the pedal arm 1. The crevice 6 has bifurcated portions 6a and 6b. One of the bifurcated portions 6a interposes the plate portion 21a and opposes the pedal arm 1, while the other bifurcated portion 6b interposes the plate portion 21b and opposes the pedal arm 1. The plate portion 21a and the plate portion 21b are mutually connected at an end portion on the side of the input rod 5 in the axial direction. The input rod 5 and the pedal arm 1 are opposed in the axial direction with the first support portion 21 interposed therebetween.

A connecting hole 1a is formed in the pedal arm 1, connecting holes 21c and 21d are formed in the plate portions 21a and 21b, and connecting holes 6c and 6d are formed in the bifurcated portions 6a and 6b. The connecting shaft 7 having a head portion 7a passes through the connecting holes 6c and 6d, the connecting holes 21c and 21d and the connecting hole 1a from one side of the bifurcated portions 6a and 6b in the direction of plate thickness, and is prevented from coming out by a clip 7b that locks to the distal end portion of the connecting shaft 7. The inner diameter of the connecting hole 1a of the pedal arm 1 is larger than the outer diameter of the connecting shaft 7. Consequently, a prescribed gap G is formed between the inner peripheral surface of the connecting hole 1a and the outer peripheral surface of the connecting shaft 7. This prescribed gap G is formed on the opposite side from the side of the input rod 5 farther in the axial direction than the connecting shaft 7. The connecting shaft 7 is able to move in the axial direction relative to the pedal arm 1 within the range of this prescribed gap G, and relative movement beyond the range of the prescribed gap G is restricted.

As shown in FIG. 3, the second support portion 22 is a plate-shaped member formed to have a U-shaped cross-section in the same manner as the first support portion 21. In the second support portion 22, a pair of mutually opposed plate portions 22a and 22b are mutually connected at an end portion on the side of the input rod 5 in the axial direction. The plate portions 22a and 22b are arranged on one side and the other side in the direction of plate thickness of the pedal arm 1. A support hole 1b is formed in the pedal arm 1. In addition, notched portions 22c and 22d are respectively formed in the plate portions 22a and 22b. A support shaft 8 having a head portion 8a passes through the notched portions 22c and 22d and the support hole 1b from one side of the plate portions 22a and 22b in the direction of plate thickness, and is prevented from coming out by forming a caulked portion 8b on the distal end portion of the support shaft 8. The notched portions 22c and 22d interpose the support shaft 8 from both sides in the axial direction, and rotational motion of the pedal arm 1 is transmitted to the second support portion 22 from the notched portions 22c and 22d.

The configuration of the second support portion 23 is similar to that of the second support portion 22, and a support shaft 9 passes through a support hole 1c of the pedal arm 1 and notched portions 23c and 23d of plate portions 23a and 23b in the direction of plate thickness. Rotational motion of the pedal arm 1 is transmitted from the notched portions 23c and 23d to the second support portion 23.

The second support portion 22 is arranged on one side of the first support portion 21 in the lengthwise direction of the pedal arm 1, while the second support portion 23 is arranged on the other side of the first support portion 21 in the lengthwise direction. In addition, the connecting shaft 7 and the support shafts 8 and 9 are arranged on the same line along the lengthwise direction of the pedal arm 1.

The first support portion 21 and the second support portion 22 are connected by elastically deformable connecting portions (strain generating bodies) 24 and 25. The connecting portions 24 and 25 deflect due to transmission of a load so that the first support portion 21 and the second support portion 22 are relatively displaced in the axial direction. In addition, as will be described later, when deflection occurs in the connecting portions 24 and 25 for which the relative displacement becomes a prescribed amount, the side of the pedal arm 1 which is the side of the shaft portion (inner peripheral surface of the connecting hole 1a) and the side of the operation target member (connecting shaft 7) make contact and an additional load is transmitted without going through the transmission member 20.

The connecting portions 24 and 25 extend in the lengthwise direction of the pedal arm 1, and are arranged in parallel between the first support portion 21 and the second support portion 22. The connecting portion 24 connects end portions on the side of the input rod 5 in the axial direction of the first support portion 21 and the second support portion 22, or in other words, apical portions of the U shape. The connecting portion 25 connects end portions on the opposite side from the side of the input rod 5 in the axial direction of the first support portion 21 and the second support portion 22. In this manner, the connecting portion 24 is arranged on one side in the axial direction of the first support portion 21 and the second support portion 22, while the connecting portion 25 is arranged on the other side in the axial direction of the first support portion 21 and the second support portion 22.

The connecting portions 24 and 25 respectively transmit an operation amount from the first support portion 21 to the second support portion 22. Similarly, the first support portion 21 and the second support portion 23 are connected by elastically deformable connecting portions 26 and 27. The connecting portion 26 connects end portions on the side of the input rod 5 in the axial direction of the first support portion 21 and the second support portion 23. The connecting portion 27 connects end portions on the opposite side from the side of the input rod 5 in the axial direction of the first support portion 21 and the second support portion 23. The connecting portion 24 and the connecting portion 25 are arranged in opposition and in parallel in the axial direction, and the connecting portion 26 and the connecting portion 27 are arranged in opposition and in parallel in the axial direction. In other words, each connecting portion is mutually opposed in a direction perpendicular to the lengthwise direction of the pedal arm 1.

Two strain sensors (detection apparatuses) 30a and 30b are attached to the connecting portion 24. The strain sensors 30a and 30b detect an operation amount based on the amount of deformation of the connecting portions 24 and 25 caused by transmission of a load. The strain sensors 30a and 30b are arranged in a row in the lengthwise direction of the pedal arm 1 on the surface of the connecting portion 24 on the side of the input rod 5 in the axial direction. Similarly, strain sensors 31a and 31b are attached to a surface of the connecting portion 26 on the side of the input rod 5 in the axial direction. Furthermore, although this explanation of the first example uses the example of the case in which the detection apparatuses consist of the strain sensors 30a, 30b, 31a and 31b that detect strain of the connecting portions 24 and 26, the detection apparatuses may also detect another amount of deformation of the connecting portions 24 and 26.

When a pedal 4 is stepped on by a passenger, the pedal arm 1 rotates using the central axial line of the rotating shaft 2 as the center of rotation. At this time, the operation amount (operating force) input to the pedal arm 1 is respectively transmitted to the second support portion 22 through the support shaft 8 and to the second support portion 23 through the support shaft 9, and then transmitted to the first support portion 21 through the connecting portions 24, 25, 26 and 27. The operating force transmitted to the first support portion 21 is transmitted to the crevice 6 and the input rod 5 through the connecting shaft 7, and then input to the master cylinder and brake booster. A reaction force from the operation target member (see arrow F in FIG. 1) acts on the first support portion 21. Due to this reaction force F, the connecting portion 24 elastically deforms so as to curve towards the side of the pedal arm 1 using the first support portion 21 and the second support portion 22 as fulcra. Similarly, the connecting portion 26 elastically deforms so as to curve towards the side of the pedal arm 1 using the first support portion 21 and the second support portion 23 as fulcra. The strain sensors 30a, 30b, 31a and 31b detect the amounts of deformation when the connecting portions 24 and 26 are elastically deformed by the operating force and reaction force F, and output the detected amounts of deformation. The strains sensors 30a, 30b, 31a and 31b are connected to an output circuit portion 32 provided in the transmission member 20. Signals indicating the detection results of the strain sensors 30a, 30b, 31a and 31b are output through the output circuit portion 32.

Since the amounts of deformation (amounts of strain) when the connecting portions 24 and 26 are elastically deformed by the reaction force F correlate with the operation amount of the pedal arm 1, the strain sensors 30a, 30b, 31a and 31b are able to detect the operation amount of the pedal arm 1 based on the amounts of deformation of the connecting portions 24 and 26. The amounts of strain detected by the strain sensors 30a, 30b, 31a and 31b can be converted to the operation amount of the pedal arm 1 using, for example, a preset map. Furthermore, although this first example is explained using as an example the case in which the operation amount is the amount of force applied when stepping on the brake pedal P, the operation amount is not limited thereto. A physical quantity such as pedal stroke may also be detected as an operation amount.

In addition, the connecting shaft 7 is able to move relative to the pedal arm 1 by an amount equal to the prescribed gap G between the connecting hole 1a and the connecting shaft 7 as was previously described. Thus, the connecting portions 24, 25, 26 and 27 are able to deflect so that the first support portion 21 and the second support portions 22 and 23 are relatively displaced in the axial direction. When the connecting portions 24, 25, 26 and 27 deflect, the first support portion 21 moves relative to the second support portions 22 and 23 to the opposite side from the side of the input rod 5 in the axial direction. The side of the pedal arm 1 and the side of the operation target member (input rod 5) approach each other in the axial direction corresponding to the amount of deflection of the connecting portions 24, 25, 26 and 27, and the prescribed gap G decreases. When the relative movement reaches a prescribed amount and the prescribed gap G is closed, the connecting shaft 7 and the inner peripheral surface of the connecting hole 1a of the pedal arm 1 make contact. As a result, the operation amount is directly transmitted to the side of the pedal arm 1 and side of the operation target member at the portion where the connecting shaft 7 makes contact with the connecting hole 1a. Consequently, a limiting mechanism is realized that limits the load that acts on the transmission member 20. This limiting mechanism is composed of the transmission. member 20, the connecting shaft 7 and the connecting hole 1a of the pedal arm 1.

The operation amount when load limitation is applied is set based on system requirements. The limiting mechanism is composed so that the operating force detection apparatus 1-1 is able to detect an operating force corresponding to the maximum braking force generated in the braking system (to be referred to as the maximum operating force), and the load is limited by the connecting shaft 7 contacting the inner peripheral surface of the connecting hole 1a (stopper) in the case the operating force has exceeded the maximum operating force. In the case the operating force has exceeded the maximum operating force, the load is preferably promptly limited so that an excessively large load does not act on the transmission member 20. Consequently, it is advantageous for the amount of increase in the amounts of deflection of the connecting portions 24, 25, 26 and 27 to be larger than the increase in the operating force.

In the operation amount detection apparatus 1-1 of the first example, the connecting portions 25 and 27 are respectively provided in parallel to the connecting portions 24 and 26. A load that acts between the second support portion 22 and the first support portion 21 is dispersed to the connecting portion 24 and the connecting portion 25, while a load that acts between the second support portion 23 and the first support portion 21 is dispersed to the connecting portion 26 and the connecting portion 27. As a result, the load acting on the connecting portion 24 can be reduced in comparison with the case of the entire load between the first support portion 21 and the second support portion 22 being supported with the connecting portion 24 acting as a detection portion to which the strain sensors 30a and 30b are attached. Reduction of the load acting on the connecting portion 24 makes it possible to reduce the strength (guaranteed strength) of the connecting portion 24. The strength of the connecting portion 26 can be similarly reduced. As a result, the amounts of deflection of the connecting portions 24 and 26 can be increased without increasing the beam length of the connecting portions 24 and 26 for the same reaction force F, thereby making it possible to realize both securing strength of the transmission member 20 and inhibiting the transmission member 20 from becoming excessively large. In addition, increasing the amounts of deformation of the connecting portions 24 and 26 per unit load demonstrates the effect of improving the detection accuracy of the detection apparatus that detects operating amount based on the amounts of deformation of the connecting portions 24 and 26 caused by transmission of a load.

For example, in the case of having provided the connecting portion 25 and reducing the load on the connecting portion 24 in half by dispersing the load, the plate thicknesses of the connecting portions 24 and 25 can be made to be $1/\sqrt{2}$ times the plate thicknesses in the case of not dispersing the load. As a result, the amounts of deflection of the connecting portions 24 and 25 can be made to be $\sqrt{2}$ times in comparison with not dispersing the load. Furthermore, although the connecting portion 24 and the connecting portion 25 are mutually opposed in the axial direction in the first example, they are not limited thereto, but rather the connecting portion 24 and the connecting portion 25 may also be mutually opposed in a direction perpendicular to the lengthwise direction of the pedal arm 1 (for example, direction of plate thickness of the pedal arm 1). As a result of making the connecting portion 24 and the connecting portion 25 mutually opposed in this manner, the load applied to the connecting portions 24 and 25 is dispersed. As a result, the amounts of deflection of the connecting portions 24 and 25 with respect to a unit load can be increased.

In addition, in the first example, the connecting portion 24 and the connecting portion 25 are formed in a shape in which the amounts of deformation per transmitted unit load are equal. The cross-sectional area of the connecting portion 24 and the cross-sectional area of the connecting portion 25 are made to be equal. The sum of the cross-sectional area of a connecting portion 25a arranged on one side in the direction of plate thickness of the pedal arm 1 and the cross-sectional surface area of a connecting portion 25b arranged on the other side are equal to the cross-sectional surface area of the connecting portion 24, and the length in the lengthwise direction of the connecting portion 24 and the length in the lengthwise direction of the connecting portion 25 are equal. As a result, the direction and/or amount of deformation of the connecting portion 24 become stable, thereby improving the detection accuracy of an operation amount. Similarly, the cross-sectional area and/or length of the connecting portion 26 and the cross-sectional area and/or length of the connecting portion 27 are made to be equal. Furthermore, if the amounts of deformation per transmitted unit load are able to be made equal, the cross-sectional areas and lengths of the connecting portion 24 and the connecting portion 25 do not have to be equal.

SECOND EXAMPLE

Figure 4A:
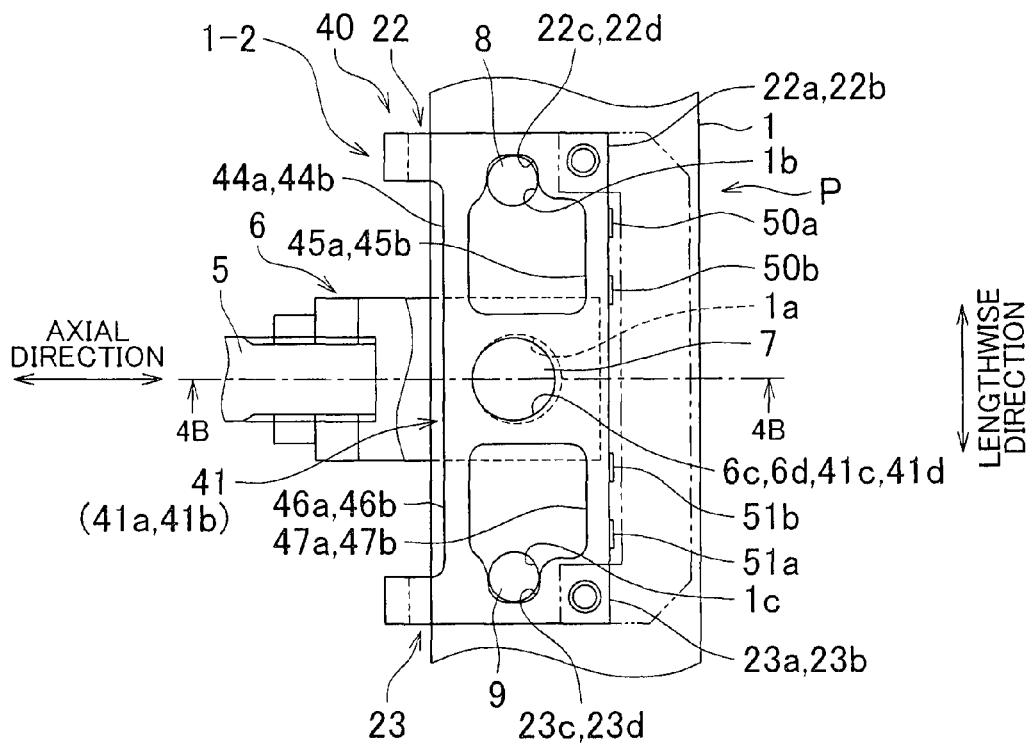
FIGS. 4A and 4B are a front view and cross-sectional view of an operation amount detection apparatus relating to a second example.
Figure 4B:
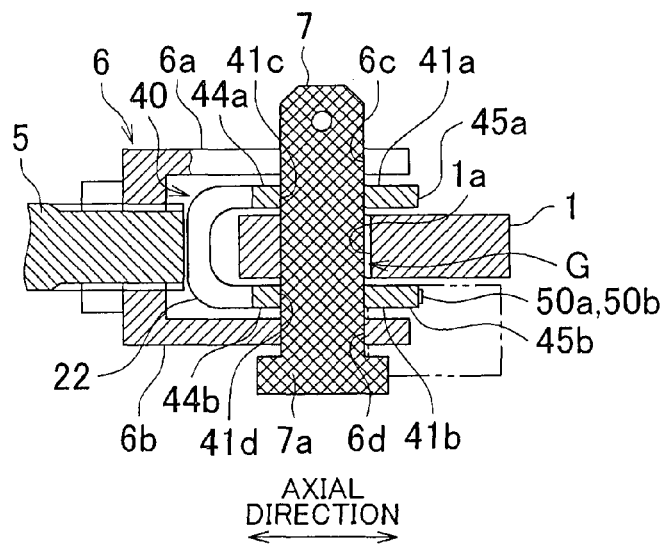

The following provides an explanation of a second example with reference to FIGS. 4A and 4B. The same reference symbols are used to indicate those members of the second example that have the same functions as those explained in the above-mentioned example, and duplicate explanations thereof are omitted. FIGS. 4A and 4B are a front view and cross-sectional view of an essential portion in which a portion has been cut away representing an operation amount detection apparatus 1-2 of the second example.

In a transmission member 40 of the second example, connecting portions 45 (45a, 45b) to which strain sensors 50 (50a, 50b) are attached and connecting portions 44 (44a, 44b) provided in parallel to the connecting portions 45 are beams having equal amounts of deformation, and are arranged in the shape of parallel link. As a result, the direction and amount of deformation of the connecting portions 45 are stabilized and detection accuracy of an operation amount is improved.

As shown in FIGS. 4A and 4B, the transmission member 40 has a first support portion 41 and the second support portions 22 and 23. The shape, arrangement and other aspects of the configuration of the second support portions 22 and 23 can be made to be the same as the second support portions 22 and 23 of the first example. The first support portion 41 differs from the first support portion 21 having a U-shaped cross-section of the first example, and is formed of a pair of mutually opposing plate portions 41a and 41b that interpose the pedal arm 1. Connecting holes 41c and 41d are respectively formed in the plate portions 41a and 41b. The connecting shaft 7 passes through the connecting holes 6c and 6d, the connecting holes 41c and 41d and the connecting hole 1a in the direction of plate thickness. The prescribed gap G is formed between the connecting shaft 7 and the inner peripheral surface of the connecting hole 1a.

Similar to the first example, the second support portion 22 is supported in the axial direction by the pedal arm 1 through the support shaft 8, and the second support portion 23 is supported in the axial direction by the pedal arm 1 through the support shaft 9.

The plate portion 41a of the first support portion 41 and the plate portion 22a of the second support portion 22 are connected by the pair of parallel connecting portions 44a and 45a. The connecting portion 44a and the connecting portion 45a are beams having equal amounts of deformation, and extend in the lengthwise direction of the pedal arm 1. Similarly, the plate portion 41b of the first support portion 41 and the plate portion 22b of the second support portion 22 are respectively connected by the connecting portions 44b and 45b that are beams having equal amounts of deformation. The strain sensors 50a and 50b are attached to the connecting portion 45b arranged on the opposite side from the side of the input rod 5 in the axial direction. The strains sensors 50a and 50b are arranged on the surface of the connecting portion 45b on the opposite side from the side of the input rod 5 in the axial direction.

Furthermore, since the operation for detecting an operation amount in the operation amount detection apparatus 1-2 of the second example is the same as that of the first example, an explanation thereof is omitted.

As a result of making the connecting portions 44 (44a, 44b) and the connecting portions 45 (45a, 45b) that are mutually opposed in the axial direction to be beams having equal amounts of deformation (equal amounts of deformation per transmitted unit load), the direction and amount of deformation of the connecting portion 45b used as a detecting portion are stabilized, thereby making it possible to improve detection accuracy of an operation amount (amount of deformation). In addition, the connecting portion 44a and the connecting portion 44b that are opposed in the direction of plate thickness are beams having equal amounts of deformation, and the connecting portion 45a and the connecting portion 45b are beams having equal amounts of deformation. In this manner, as a result of making corresponding connecting portions in the direction of plate thickness of the pedal arm 1 to be beams having equal amounts of deformation, the direction and amount of deformation of the connecting portion 45b are stabilized, thereby making it possible to improve detection accuracy of an operation amount.

Furthermore, connecting portions that connect the first support portion 41 and the second support portion 23 are the same as the connecting portions 44 and 45 that connect the first support portion 41 and the second support portion 22, a pair of connecting portions 46a and 47a that connect the plate portion 41a and the plate portion 23a are beams having equal amounts of deformation, and a pair of connecting portions 46b and 47b that connect the plate portion 41b and the plate portion 23b are beams having equal amounts of deformation. Moreover, the connecting portion 46a and the connecting portion 46b that are mutually opposed in the direction of plate thickness are beams having equal amounts of deformation, and the connecting portion 47a and the connecting portion 47b are beams having equal amounts of deformation. The strain sensors 51 (51a, 51b) are attached to the connecting portion 47b. The connecting portion 47b is a member that connects end portions of the plate portion 41b and the plate portion 23b on the opposite side from the side of the input rod 5 in the axial direction. The direction and amount of deformation of the connecting portion 47b used as a detecting portion are stabilized, thereby making it possible to realize improvement of detection accuracy of an operation amount.

A load that acts between the first support portion 41 and the second support portion 22 is dispersed between the connecting portions 44 and the connecting portions 45, and a load that acts between the first support portion 41 and the second support portion 23 is dispersed between the connecting portions 46 (46a, 46b) and the connecting portions 47 (47a, 47b). Accordingly, similar to the first example, in comparison with the case in which the connecting portions 45 and 47 respectively and independently support a load, the amounts of deflection of the connecting portions 45 and 47 can be increased without increasing the beam lengths of the connecting portions 45 and 47, thereby making it possible to realize both securing strength of the transmission member 40 and inhibiting the transmission member 40 from becoming excessively large.

In addition, the first support portion 41 differs from the first support portion 21 having a U-shaped cross-section of the first example, and is formed of a pair of mutually opposed plate portions 41a and 41b that interpose the pedal arm 1. As a result, space in the axial direction required to arrange the first support portion 41 can be reduced and the pedal arm 1 and the input rod 5 can be arranged in close proximity in the axial direction.

THIRD EXAMPLE

Figure 5A:
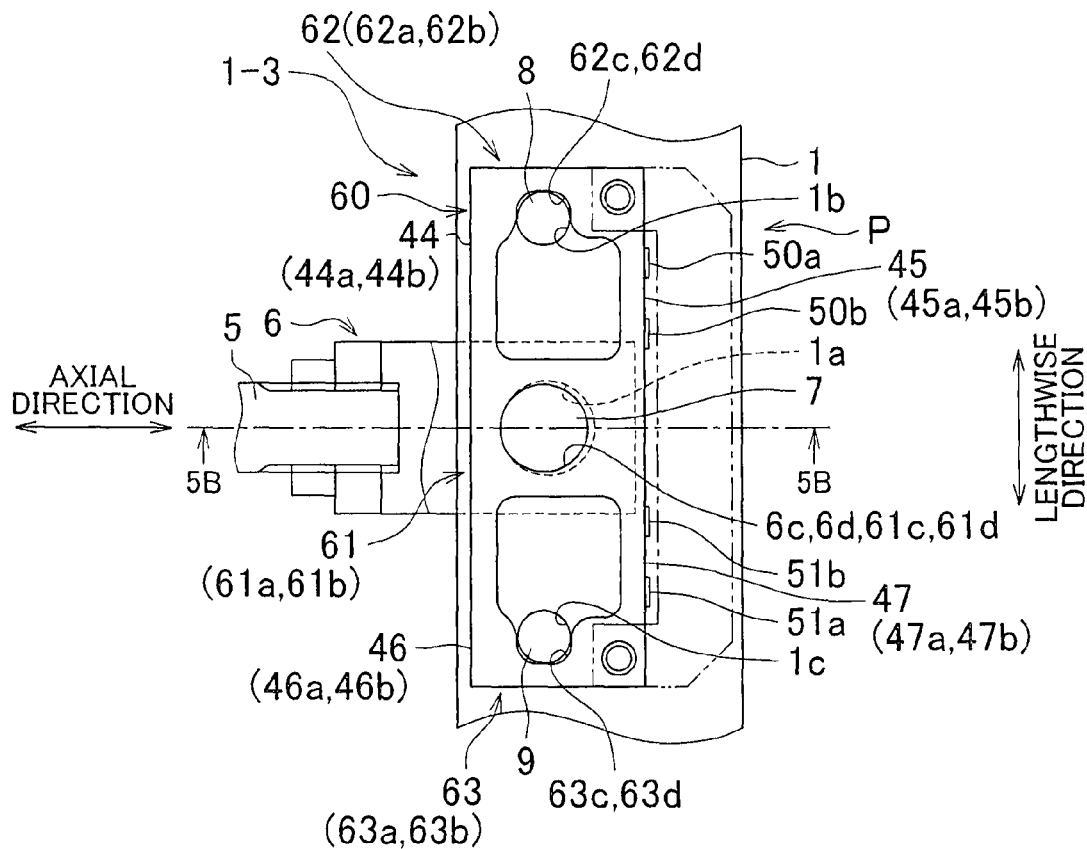
FIGS. 5A and 5B are a front view and cross-sectional view of an operation amount detection apparatus relating to a third example.
Figure 5B:
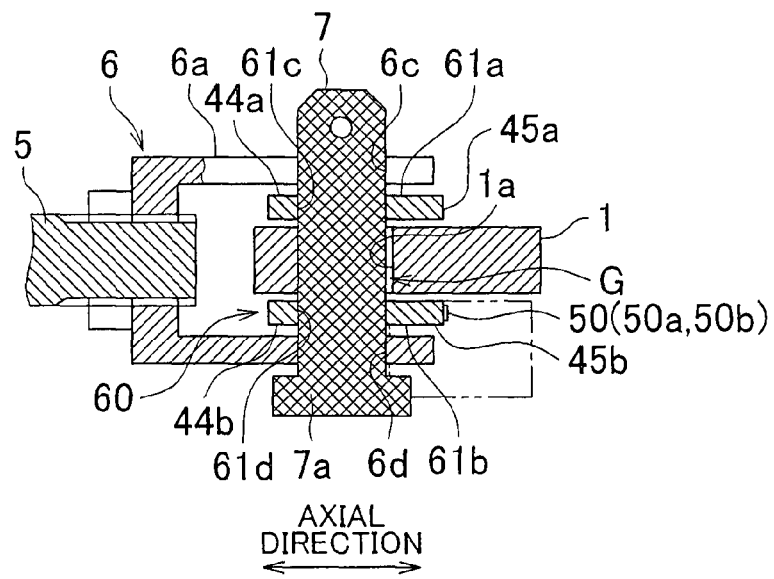

The following provides an explanation of a third example with reference to FIGS. 5A and 5B. The same reference symbols are used to indicate those members of the third example that have the same functions as those explained in the above-mentioned examples, and duplicate explanations thereof are omitted. FIGS. 5A and 5B are a front view and cross-sectional view of an essential portion in which a portion has been cut away representing an operation amount detection apparatus 1-3 of the third example.

In a transmission member 60 of the third example, a configuration is employed in which a first support portion 61 and either of a second support portion 62 or 63 consist of a pair of mutually independent plate portions. As a result, the transmission member 60 can be formed of two independent plate members, thereby making it possible to realize compact size, improved moldability and reduced costs by virtue of reducing the space required by the transmission member 60.

Similar to the first support portion 41 of the second example, a first support portion 61 is formed of a pair of mutually opposing plate portions 61a and 61b that interpose the pedal arm 1. Connecting holes 61c and 61d are respectively formed in the plate portions 61a and 61b, and the connecting shaft 7 passes through the connecting holes 6c and 6d, the connecting holes 61c and 61d and the connecting hole 1a in the direction of plate thickness. The prescribed gap G is formed between the connecting shaft 7 and the inner peripheral surface of the connecting hole 1a.

The second support portions 62 and 63 are respectively formed of a pair of mutually opposing plate portions 62a and 62b and a pair of mutually opposing plate portions 63a and 63b. Notched portions 62c and 62d are respectively formed in the plate portions 62a and 62b that are mutually independent members. The support shaft 8 passes through the notched portions 62c and 62d and the support hole 1b in the direction of plate thickness. The second support portion 62 is supported in the axial direction by the pedal arm 1 through the support shaft 8. Notched portions 63c and 63d are respectively formed in the plate portions 63a and 63b that mutually independent members, and the support shaft 9 passes through the notched portions 63c and 63d and the support hole 1c in the direction of plate thickness. The second support portion 63 is supported in the axial direction by the pedal arm 1 through the support shaft 9. The connecting shaft 7 and the support shafts 8 and 9 are arranged on the same line along the axial direction of the pedal arm 1.

The first support portion 61 and the second support portion 62 are respectively connected by the connecting portion 44 and the connecting portion 45 in the same manner as the second example. The plate portion 61a of the first support portion 61 and the plate portion 62a and the second support portion 62 are respectively connected by the pair of connecting portions 44a and 45a. Similarly, the plate portion 61b of the first support portion 61 and the plate portion 62b of the second support portion 62 are respectively connected by the connecting portions 44b and 45b. The strain sensors 50a and 50b are attached to the connecting portion 45b arranged on the opposite side from the side of the input rod 5 in the axial direction.

Connection between the first support portion 61 and the second support portion 63 is the same as that of the second example, with the plate portion 61a and the plate portion 63a respectively being connected by the connecting portions 46a and 47a, and the plate portion 61b and the plate portion 63b respectively being connected by the connecting portions 46b and 47b. The strain sensors 51a and 51b are attached to the connecting portion 47b.

Furthermore, since the operation for detecting an operation amount in the operation amount detection apparatus 1-3 of the third example is the same as that of the first example, an explanation thereof is omitted.

As a result of making all of the first support portion 61 and the second support portions 62 and 63 to be plate members, the transmission member 60 can be formed of plate members only. For example, the plate portions 61a, 62a and 63a and the connecting portions 44a, 45a, 46a and 47a can be formed into a single unit, and the plate portions 61b, 62b and 63b and the connecting portions 44b, 45b, 46b and 47b can similarly be formed into a single unit. As a result, moldability can be improved and costs can be reduced.

In addition, as a result of employing a configuration consisting of a pair of independent constituent portions for the transmission member 60, the amount of required space can be reduced. In the case of using independent members for the opposing plate portions that interpose the pedal arm 1 (such as the plate portion 62a and the plate portion 62b), members that mutually connect the plate portions (such as members that connect them in the shape of the letter U) are no longer required, thereby resulting in a corresponding reduction in the amount of space required for the transmission member 60 in the axial direction. For example, the transmission member 60 can be arranged in the axial direction within a range of the width of the pedal arm 1. As a result, the amount of space required by the operation amount detection apparatus 1-3 in the axial direction can be reduced, thereby making it possible to realize compact size.

FOURTH EXAMPLE

Figure 6:
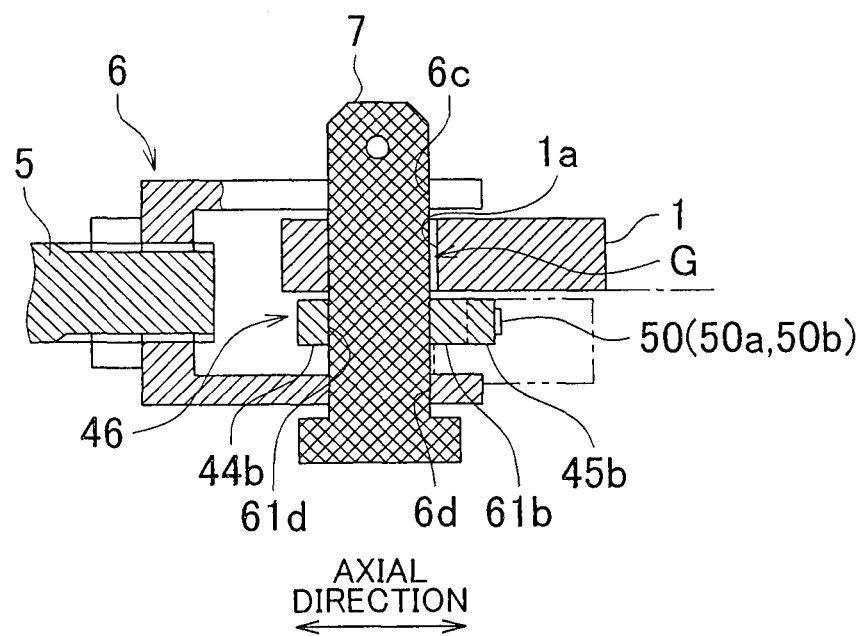
FIG. 6 is a cross-sectional view showing a first support portion of an operation amount detection apparatus relating to a fourth example.

The following provides an explanation of a fourth example with reference to FIG. 6. The same reference symbols are used to indicate those members of the fourth example that have the same functions as those explained in the above-mentioned examples, and duplicate explanations thereof are omitted. FIG. 6 is a cross-sectional view schematically showing a first support portion of an operation amount detection apparatus 1-4 of the fourth example.

Although the transmission member 60 was arranged on both sides in the direction of plate thickness of the pedal arm 1 in the third example, in this fourth example, a transmission member 70 is only arranged on one side in the direction of plate thickness. The transmission member 70 can be configured in the same manner as the configuration of the transmission member 60 of the third example with the exception of omitting the plate portions 61a, 62a and 63a and the connecting portions 44a, 45a, 46a and 47a. Both securing strength of the transmission member 70 and inhibiting the transmission member 70 from becoming excessively large can be realized in the same manner as each of the previous examples even if this configuration is employed.

In addition, since the transmission member 70 is only arranged on one side of the pedal arm 1 in the direction of plate thickness, the operation amount detection apparatus 1-4 can be made even more compact.

FIFTH EXAMPLE

Figure 7A:
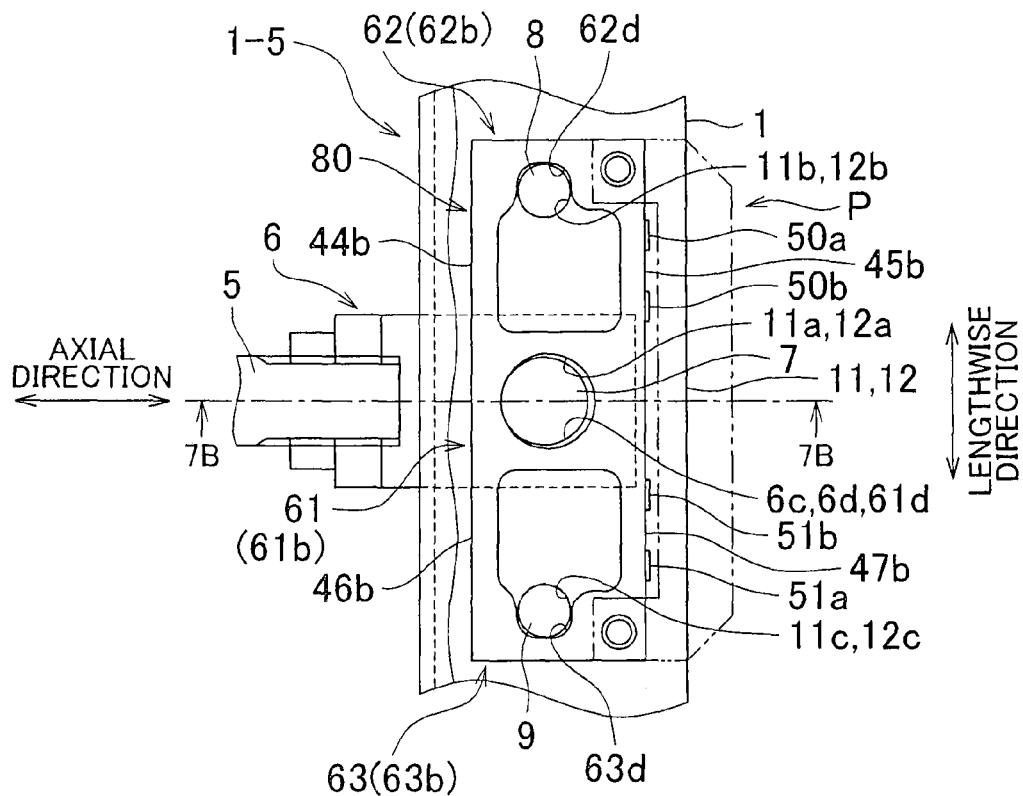
FIGS. 7A and 7B are a front view and cross-sectional view of an operation amount detection apparatus relating to a fifth example.
Figure 7B:
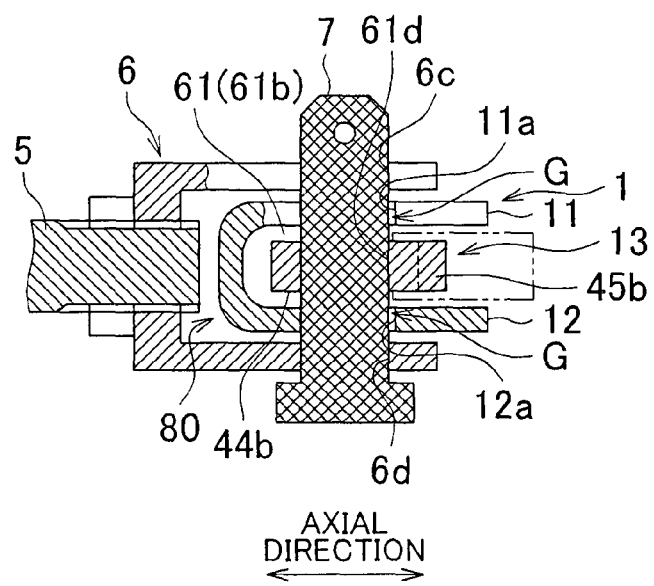

The following provides an explanation of a fifth example with reference to FIGS. 7A and 7B. The same reference symbols are used to indicate those members of the fifth example that have the same functions as those explained in the above-mentioned examples, and duplicate explanations thereof are omitted. FIGS. 7A and 7B are a front view and cross-sectional view of an essential portion in which a portion has been cut away representing an operation amount detection apparatus 1-5 of the fifth example.

As shown in FIGS. 7A and 7B, the pedal arm 1 is formed to have a U-shaped cross-section that is perpendicular to the lengthwise direction. The pedal arm 1 has a pair of mutually opposing plate portions 11 and 12 in the direction of plate thickness, and the plate portions 11 and 12 are mutually connected at an end portion on the side of the input rod 5 in the axial direction. A transmission member 80 is arranged between the pair of plate portions 11 and 12, and namely in a space 13 on the inside of the U shape. The configuration of the transmission member 80 can be the same as that of the transmission member 70 of the fourth example. Namely, the transmission member 80 has the plate portion 61b as the first support portion 61, the plate portions 62b and 63b as the second support portions 62 and 63, and the connecting portions 44b, 45b, 46b and 47b. The strain sensors 50a and 50b are attached to the connecting portion 45b, and the strain sensors 51a and 51b are attached to the connecting portion 47b.

Connecting holes 11a and 12a are respectively formed in the plate portions 11 and 12 of the pedal arm 1. The connecting shaft 7 passes through the connecting holes 6c and 6d, the connecting hole 61d and the connecting holes 11a and 12a in the direction of plate thickness. Support holes 11b and 12b and support holes 11c and 12c are respectively formed in the plate portions 11 and 12 of the pedal arm 1 at locations corresponding to the second support portions 62 and 63. The support shaft 8 passes through the support holes 11b and 12b and the notched portion 62d of the second support portion 62 in the direction of plate thickness, and the support shaft 9 passes through the support holes 11c and 12c and the notched portion 63d of the second support portion 63 in the direction of plate thickness. The second support portion 62 is supported in the axial direction by the plate portions 11 and 12 through the support shaft 8. The second support portion 63 is supported in the axial direction by the plate portions 11 and 12 through the support shaft 9. The inner diameter of the connecting holes 11a and 12a is larger than the outer diameter of the connecting shaft 7 in the same manner as the inner diameter of the connecting hole 1a in each of the previously described examples, and the prescribed gap G is formed between the inner peripheral surfaces of the connecting holes 11a and 12a and the outer peripheral surface of the connecting shaft 7.

Furthermore, since the operation for detecting an operation amount in the operation amount detection apparatus 1-5 of the fifth example is the same as that of the first example, an explanation thereof is omitted.

According to the operation amount detection apparatus 1-5 of the fifth example, the transmission member 80 is arranged within the pedal arm 1. As a result, space efficiency can be improved.

SIXTH EXAMPLE

Figure 8A:
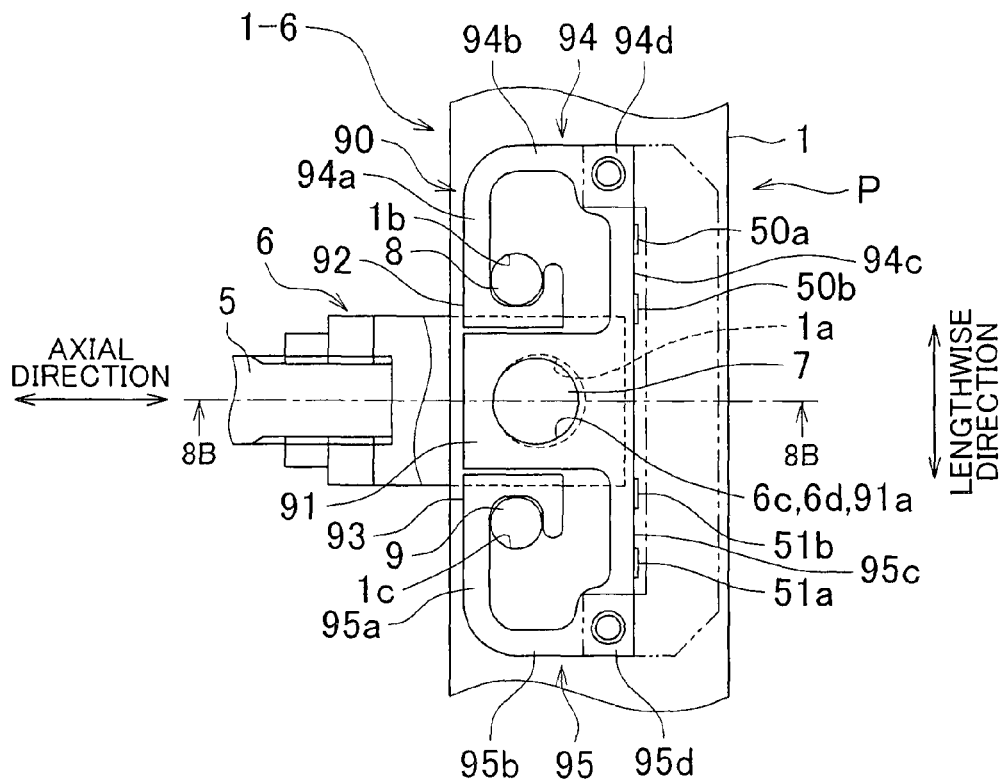
FIGS. 8A and 8B are a front view and cross-sectional view of an operation amount detection apparatus relating to a sixth example.
Figure 8B:
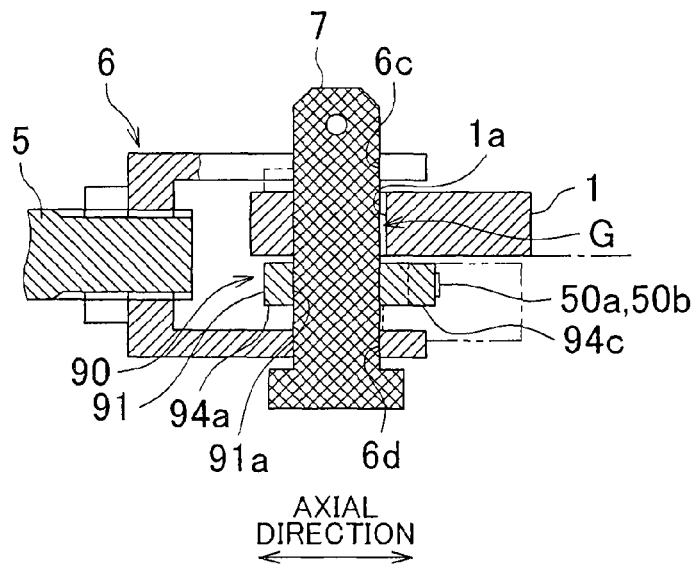

The following provides an explanation of a sixth example with reference to FIGS. 8A and 8B. The same reference symbols are used to indicate those members of the sixth example that have the same functions as those explained in the above-mentioned examples, and duplicate explanations thereof are omitted. FIGS. 8A and 8B are a front view and cross-sectional view of an essential portion in which a portion has been cut away representing an operation amount detection apparatus 1-6 of the sixth example.

In the operation amount detection apparatus 1-6 of the sixth example, connecting portions 94 and 95, which connect a first support portion 91 with second support portions 92 and 93, are connected in series on a load transmission path between the first support portion 91 and the second support portions 92 and 93, and have a plurality of curved and connected constituent portions. The connecting portions 94 and 95 are provided on both sides in the lengthwise direction of the pedal arm 1 while interposing the first support portion 91 and the second support portion 92. The connecting portions 94 and 95 deflect so that the first support portion 91 and the second support portions 92 and 93 are relatively displaced in the axial direction due to transmission of a load in the same manner as the connecting portions of each of the previously described examples. The pedal arm 1 side and the operation target member side make contact when deflection occurs in the connecting portions 94 and 95 in which the relative displacement becomes a prescribed amount. As a result, a load can further be transmitted without going through the transmission member 90.

The connecting portions 94 and 95 are turned around in the lengthwise direction of the pedal arm 1 from the first support portion 91 between the second support portions 92 and 93. As a result, the total length of those members in which deflection occurs in, the axial direction due to transmission of an operating force can be increased. In other words, a large amount of deflection can be realized by dispersing the deflection among a plurality of members. As a result, the amount of deflection in the axial direction between the first support portion 91 and the second support portions 92 and 93 can be increased in the connecting portions 94 and 95.

As shown in FIG. 8B, the transmission member 90 is arranged on one side in the direction of plate thickness of the pedal arm 1. The first support portion 91 is a plate member, and a connecting hole 91a is formed therein. The connecting shaft 7 passes through the connecting holes 6c and 6d, the connecting hole 91a and the connecting hole 1a in the direction of plate thickness. The prescribed gap G is formed between the connecting hole 1a and the connecting shaft 7.

The second support portions 92 and 93 are formed in the shape of the letter U and respectively interpose the support shafts 8 and 9 from both sides in the axial direction. The second support portions 92 and 93 are supported by the support shafts 8 and 9 in a state in which they are able to rotate relative to the support shafts 8 and 9. The second support portions 92 and 93 are supported in the axial direction by the pedal arm 1 through the support shafts 8 and 9, and an operation amount of the pedal arm 1 is respectively transmitted to the second support portions 92 and 93 through the support shafts 8 and 9. The support shaft 8 and the support shaft 9 are arranged interposing the connecting shaft 7 in the lengthwise direction of the pedal arm 1.

The connecting portion 94 that connects the first support portion 91 and the second support portion 92 is a U-shaped member that opens towards the first support portion 91, and protrudes in a direction that moves away from the first support portion 91 and the second support portion 92 in the lengthwise direction of the pedal arm 1. The connecting portion 94 has a first constituent portion 94a, a second constituent portion 94b and a third constituent portion 94c. The first constituent portion 94a and the third constituent portion 94c extend in the lengthwise direction of the pedal arm 1, or in other words, in the direction perpendicular to the axial direction. In other words, the connecting portion 94 has the first constituent portion 94a and the third constituent portion 94c that are two members in which deflection occurs in the axial direction due to transmission of an operating force.

The first constituent portion 94a is arranged more to the side of the input rod 5 than the third constituent portion 94c. One end of the first constituent portion 94a is connected to the second support portion 92, and the other end is connected to the second constituent portion 94b. One end of the third constituent portion 94c is connected to the first support portion 91, and the other end is connected to the second constituent portion 94b. The second constituent portion 94b connects the first constituent portion 94a and the third constituent portion 94c in the axial direction. In addition, the region where the first constituent portion 94a is arranged and the region where the third constituent portion 94c is arranged overlap in the lengthwise direction of the pedal arm 1. The first constituent portion 94a and the third constituent portion 94c are opposite each other in the axial direction. A plurality of the strain sensors 50a and 50b are attached to the third constituent portion 94c along the lengthwise direction of the pedal arm 1.

The first support portion 91 and the second support portion 93 are connected by the connecting portion 95 having a first constituent portion 95a, a second constituent portion 95b and a third constituent portion 95c, similarly to the connecting portion 94. A plurality of the strain sensors 51a and 51b are attached to the third constituent portion 95c along the lengthwise direction of the pedal arm 1. The strain sensors 50b and 51b are arranged more to the side of the first support portion 91 in the lengthwise direction than the strain sensors 50a and 51a.

As a result of providing a plurality of constituent portions that extend in the direction perpendicular to the axial direction and in which deflection occurs in the axial direction, the total amount of deflection in the axial direction of the connecting portions 94 and 95 during transmission of an operation amount increases. In other words, the increase in the amount of relative movement in the axial direction of the first support portion 91 and the second support portions 92 and 93 increases with respect to an increase in an operation amount that is input during transmission of the operation amount. Moreover, as a result of the second constituent portion 94b deflecting in the lengthwise direction of the pedal arm 1 during transmission of an operation amount, the amount of relative movement in the axial direction between the first support portion 91 and the second support portions 92 and 93 can be increased. In addition, since the second support portions 92 and 93 are able to rotate relative to the support shafts 8 and 9, the first constituent portions 94a and 95a are able to rotate during transmission of an operation amount, and are able to increase the amount of relative movement in the axial direction between the first support portion 91 and the second support portions 92 and 93. As a result, the size of the load on the connecting portions 94 and 95 when the load is limited can be reduced. In addition, since the connecting portions 94 and 95 have a curved shape, the total length of the transmission member 90 in the lengthwise direction of the pedal arm 1 can be reduced as compared with the case of realizing the same amount of deflection with a single linear connecting portion. Accordingly, both securing strength of the transmission member 90 and inhibiting the transmission member 90 from becoming excessively large can be realized.

In the sixth example, the connecting portion between the support shaft 8 and the second support portion 92 in the lengthwise direction of the pedal arm 1 is offset to the side of the first support portion 91 from the connecting portion 94d between the second constituent portion 94b and the third constituent portion 94c. Similarly, the connecting portion between the support shaft 9 and the second support portion 93 is offset to the side of the first support portion 91 from the connecting portion 95d between the second constituent portion 95b and the third constituent portion 95c. As a result, the third constituent portions (prescribed constituent portion, detection portion constituent portion) 94c and 95c curve in the shape of the letter S during transmission of an operation amount. Since the support shafts 8 and 9 are offset towards the first support portion 91 from the connecting portions 94d and 95d as previously described, a moment that causes the third constituent portions 94c and 95c to curve towards the input rod 5 respectively acts on the side of the connecting portion 94d in the third constituent portion 94c and on the side of the connecting portion 95d in the third constituent portion 95c. Consequently, the third constituent portions 94c and 95c curve in the shape of an S so that the strain sensors 50a and 51a bend in the direction of in which they are compressed together, and the strain sensors 50b and 51b bend in the direction in which they are pulled apart. In other words, the first support portion 91 and the second support portions 92 and 93 are respectively supported by the pedal arm 1 and an operation target member so that moments that cause curvature in mutually different directions act on one side and the other side in the direction perpendicular to the axial direction in the third constituent portions 94c and 95c due to transmission of a load.

The strain sensors 50a and 50b are able to respectively detect the amount of compressive strain and the amount of tensile strain of the third constituent portion 94c, and the strain sensors 51a and 51b are able to respectively detect the amount of compressive strain and the amount of tensile strain of the third constituent portion 95c. As a result, the detection accuracy of an operation amount can be improved by eliminating detection error attributable to thermal expansion and the like of the third constituent portions 94c and 95c.

Furthermore, in the connecting portion 94, deformation characteristics between the third constituent portion 94c, to which the strain sensors 50a and 50b are attached, and the first constituent portion 94a and the second constituent portion 94b may be made to differ. For example, the first constituent portion 94a and the second constituent portion 94b can have deformation characteristics in which the amount of deflection is large and the amount of strain is small in comparison with the third constituent portion 94c, or conversely, the third constituent portion 94c can have deformation characteristics in which the amount of deflection is small and the amount of strain is large in comparison with the first constituent portion 94a and the second constituent portion 94b. In this case, detection accuracy (SN ratio) of an operation amount can be improved since amounts of displacement in the axial direction relative to the first support portion 91 and the second support portion 92 are secured for the first constituent portion 94a and the second constituent portion 94b, and the third constituent portion 94c demonstrates a large amount of strain. This applies to similarly to the connecting portion 95 as well.

SEVENTH EXAMPLE

Figure 9A:
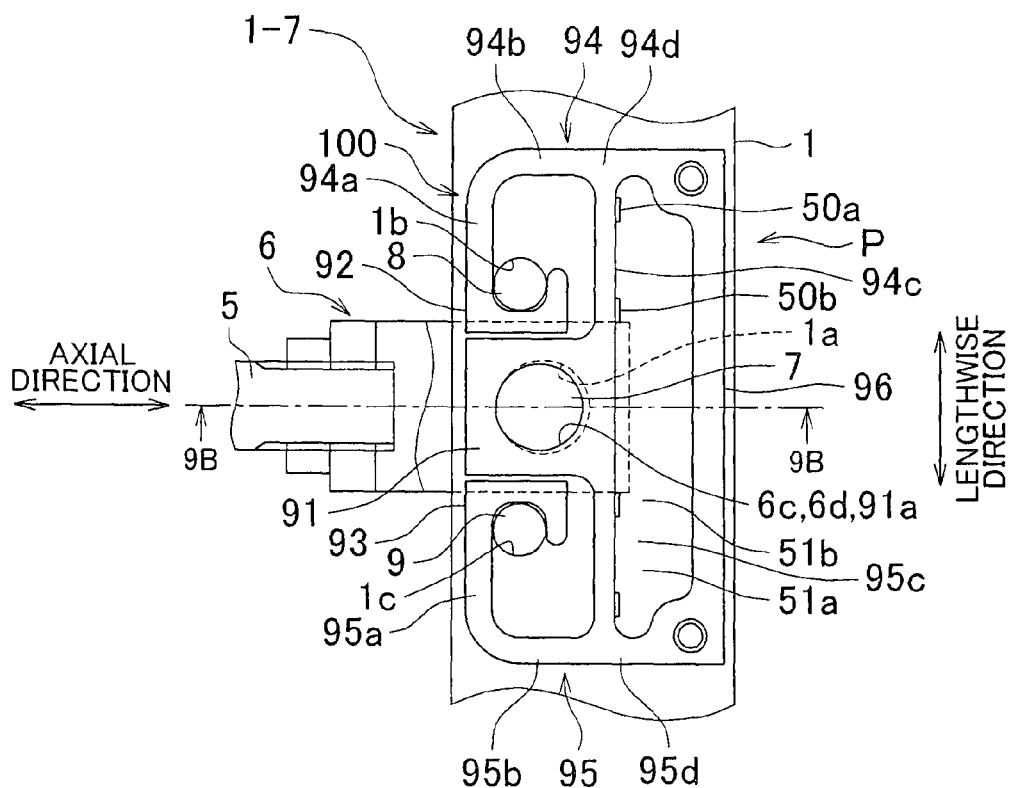
FIGS. 9A and 9B are a front view and cross-sectional view of an operation amount detection apparatus relating to a seventh example.
Figure 9B:
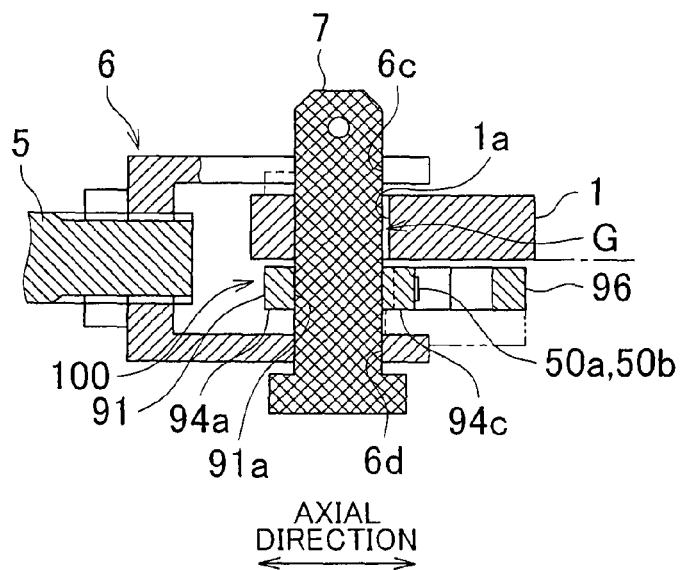

The following provides an explanation of a seventh example with reference to FIGS. 9A and 9B. The same reference symbols are used to indicate those members of the seventh example that have the same functions as those explained in the above-mentioned examples, and duplicate explanations thereof are omitted. FIGS. 9A and 9B are a front view and cross-sectional view of an essential portion in which a portion has been cut away representing an operation amount detection apparatus 1-7 of the seventh example.

In the operation amount detection apparatus 1-7 of the seventh example, a transmission member 100 is configured such that end portions of the third constituent portions 94c and 95c are connected by a connecting member 96 in comparison with the transmission member 90 of the sixth example. As a result, the third constituent portions 94c and 95c can be curved into the shape of the letter S regardless of the locations of the connecting portions (fulcra) between the second support portions 92 and 93 and the support shafts 8 and 9 in the lengthwise direction of the pedal arm 1.

As shown in FIGS. 9A and 9B, the transmission member 100 has the connecting member 96 that differs from the constituent portions 94a, 94b, 94c, 95a, 95b and 95c. The connecting member 96 extends in the lengthwise direction of the pedal arm 1. The connecting member 96 connects an end portion of the third constituent portion 94c on the opposite side from the side connected to the first support portion 91 (constituent portion 94d) and an end portion of the third constituent portion 95c on the opposite side from the side connected to the first support portion 91 (constituent portion 95d). End portions of the third constituent portions 94c and 95c on the opposite side from the first support portion 91 are restrained by the connecting member 96. As a result, the third constituent portions 94c and 95c curve into the shape of an S during transmission of an operation amount regardless of the locations of the fulcra of the second support portions 92 and 93 (whether or not the support shafts 8 and 9 are offset in the lengthwise direction of the pedal arm 1 from the connecting portions 94d and 95d). As a result, detection accuracy of an operation amount can be improved by eliminating detection error attributable to thermal expansion and the like of the third constituent portions 94c and 95c.

In addition, similar to the sixth example, the shapes of the first constituent portions 94a and 95a, the shapes of the second constituent portions 94b and 95b (deformation characteristics) and the shapes of the third constituent portions 94c and 95c (deformation characteristics) can be set mutually independently. Accordingly, the setting degree of freedom of the transmission member 100 can be increased and SN ratio can be improved.

Furthermore, since the operation for detecting an operation amount in the operation amount detection apparatus 1-7 is the same as that of the sixth example, an explanation thereof is omitted.

EIGHTH EXAMPLE

Figure 10A:
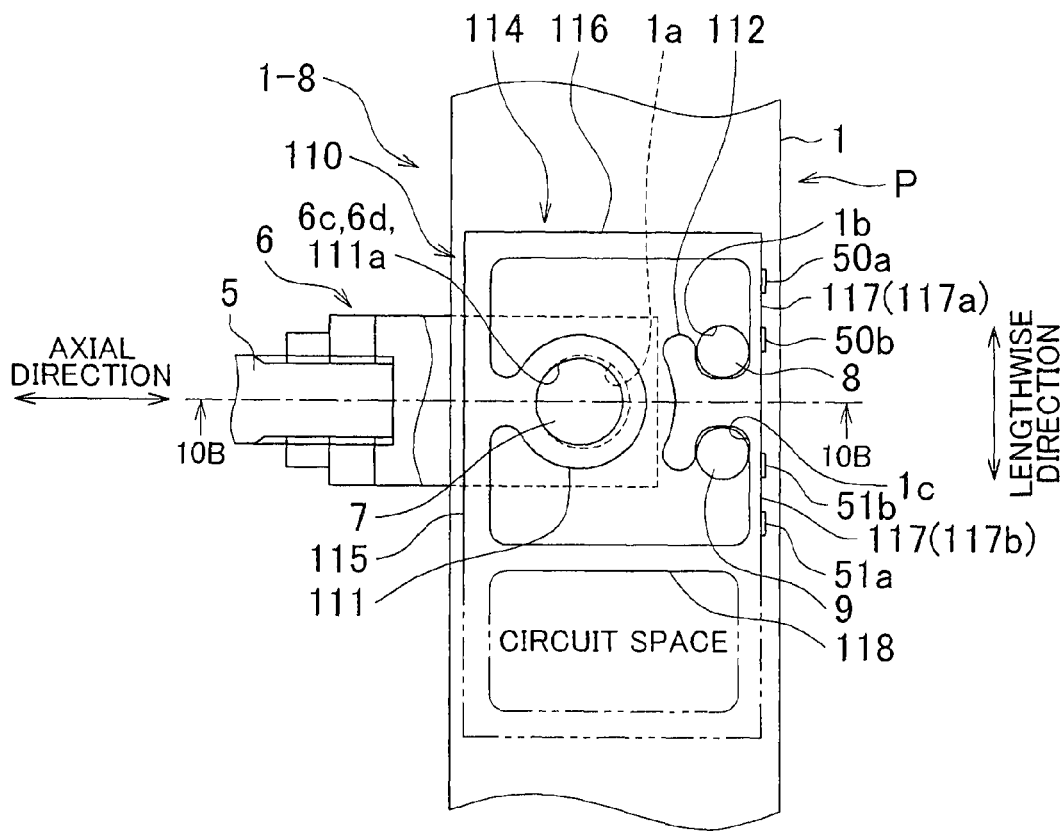
FIGS. 10A and 10B are a front view and cross-sectional view of an operation amount detection apparatus relating to an eighth example.
Figure 10B:
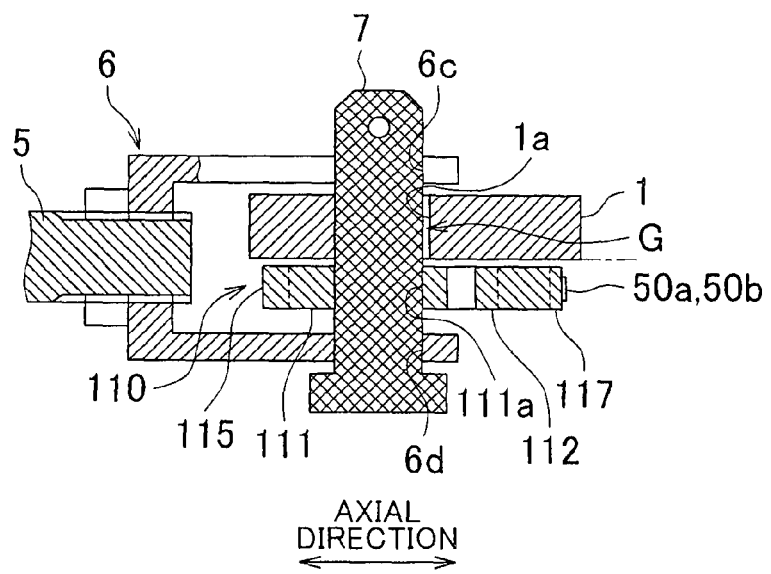

The following provides an explanation of an eighth example with reference to FIGS. 10A and 10B. The same reference symbols are used to indicate those members of the eighth example that have the same functions as those explained in the above-mentioned examples, and duplicate explanations thereof are omitted. FIGS. 10A and 10B are a front view and cross-sectional view of an essential portion in which a portion has been cut away representing an operation amount detection apparatus 1-8 of the eighth example.

As shown in FIGS. 10A and 10B, transmission member 110 is arranged on one side in the direction of plate thickness of the pedal arm 1. The transmission member 110 has a first support portion 111, a second support portion 112 and a connecting portion 114. The first support portion 111 and the second support portion 112 are opposed in the axial direction on the central axial line of the input rod 5. A connecting hole 111a is formed in the first support portion 111. The connecting shaft 7 passes through the connecting holes 6c and 6d, the connecting hole 111a and the connecting hole 1a in the direction of plate thickness. The prescribed gap G is formed between the connecting shaft 7 and the connecting hole 1a. The second support portion 112 respectively interposes the support shafts 8 and 9 that pass through the support holes 1b and 1c of the pedal arm 1 from both sides in the axial direction, and is supported in the axial direction by the pedal arm 1 through the support shafts 8 and 9. An operation amount (advancing and receding operations in the axial direction) of the pedal arm 1 is transmitted to the second support portion 112 through the support shafts 8 and 9.

The first support portion 111 and the second support portion 112 are connected by the connecting portion 114. The connecting portion 114 is formed into the shape of a rectangular frame. The connecting portion 114 has a mutually parallel first constituent portion 115 and third constituent portion 117 extending in the lengthwise direction of the pedal arm 1 and a mutually parallel second constituent portion 116 and fourth constituent portion 118 extending in the axial direction. The first constituent portion 115 and the third constituent portion 117 are a pair of constituent portions mutually opposed in the axial direction. The first constituent portion 115 is arranged more on the side of the input rod 5 in the axial direction than the third constituent portion 117. The second constituent portion 116 and the fourth constituent portion 118 are both end constituent portions that respectively connect the first constituent portion 115 and the third constituent portion 117 at both ends thereof. The second constituent portion 116 connects one end of the first constituent portion 115 and one end of the third constituent portion 117, while the fourth constituent portion 118 connects the other end of the first constituent portion 115 and the other end of the third constituent portion 117. The first support portion 111 is connected to the side of the third constituent portion 117 of the first constituent portion 115, and the second support portion 112 is connected to the side of the first constituent portion 115 of the third constituent portion 117. In addition, the first support portion 111 is connected to a central portion in the lengthwise direction of the pedal arm 1 of the first constituent portion 115, and the second support portion 112 is connected to a central portion in the lengthwise direction of the pedal arm 1 of the third constituent portion 117.

The strain sensors 50a, 50b, 51a and 51b are attached on the opposite side from the side of the input rod 5 in the axial direction to the third constituent portion 117. In the lengthwise direction of the pedal arm 1, the strain sensors 50a and 50b are arranged more to one side than the connecting portion with the second support portion 112, and the strain sensors 51a and 51b are arranged more to the other side than the connecting portion with the second support portion 112. The strain sensors 50b and 51b are respectively arranged more to the side of the second support portion 112 than the strain sensors 50a and 51a.

The connecting portion 114 generates stress as a spring in which the mutually different first constituent portion 115, second constituent portion 116, third constituent portion 117 and fourth constituent portion 118 are arranged in multiple stages. As a result, similar to the sixth example and the seventh example, relative displacement in the axial direction between the first support portion 111 and the second support portion 112 can be made to be large. In addition, since the side of the second constituent portion 116 and the side of the fourth constituent portion 118 are provided in parallel, and are supported by dispersing a load between the first support portion 111 and the second support portion 112, guaranteed strength of the connecting portion 114 can be reduced.

The connecting portion 114 is formed in the shape of a closed frame. Both end portions of the third constituent portion 117 are restrained by being connected to the first constituent portion 115 through the second constituent portion 116 and the fourth constituent portion 118. As a result, when an operation amount is input from the pedal arm 1 to the second support portion 112 through the support shafts 8 and 9, one side and the other side of the third constituent portion 117 respectively curve in the shape of the letter S while interposing the second support portion 112. In the third constituent portion 117, the portion where the strain sensors 50a and 50b are attached (see reference symbol 117a) curves in the shape of the letter S such that the strain sensor 50a bends in the direction of tension while the strain sensor 50b bends in the direction of compression. In addition, in the third constituent portion 117, the portion where the strain sensors 51a and 51b are attached (see reference symbol 117b) curves in the shape of the letter S such that the strain sensor 51a bends in the direction of tension while the strain sensor 51b bends in the direction of compression. As a result, detection accuracy of an operation amount can be improved by eliminating detection error attributable to thermal expansion and the like of the third constituent portion 117.

In addition, since the connecting portion 114 is formed in the shape of a frame, rigidity in directions other than that in which a load is applied due to transmission of an operation amount is secured. For example, detection accuracy of an operation amount is improved as a result of securing rigidity of the connecting portion 114 with respect to torsion other than deflection in the axial direction.

NINTH EXAMPLE

Figure 11A:
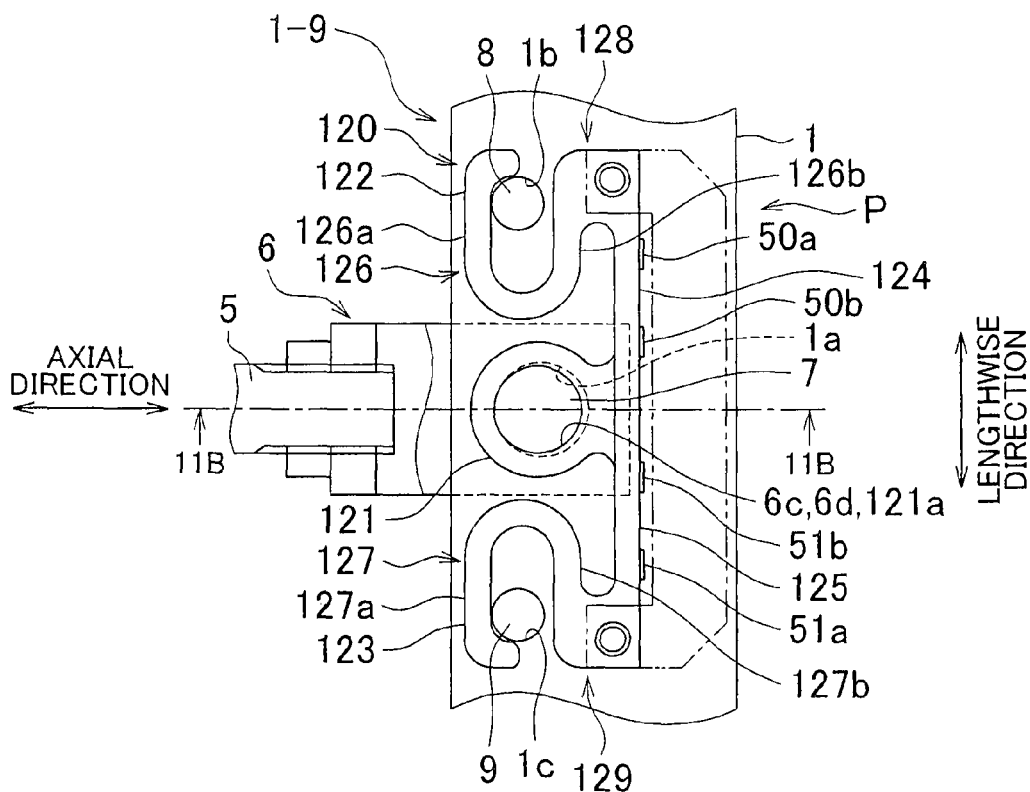
FIGS. 11A and 11B are a front view and cross-sectional view of an operation amount detection apparatus relating to a ninth example.
Figure 11B:
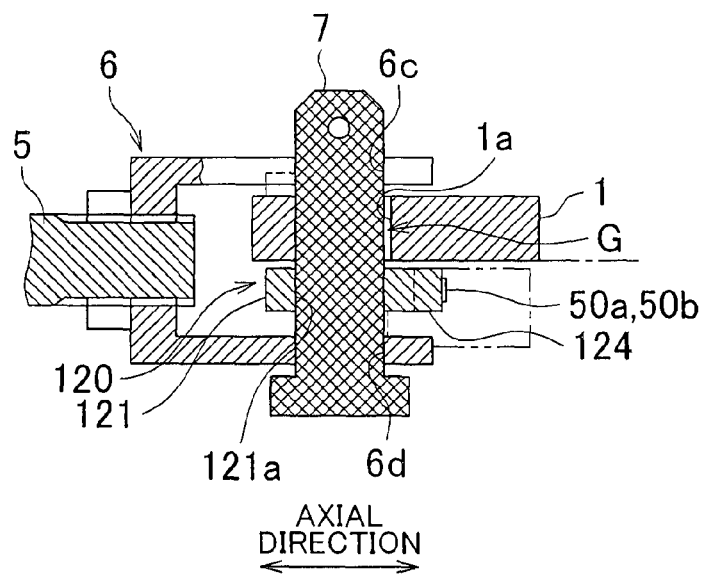

The following provides an explanation of a ninth example with reference to FIGS. 11A and 11B. The same reference symbols are used to indicate those members of the ninth example that have the same functions as those explained in the above-mentioned examples, and duplicate explanations thereof are omitted. FIGS. 11A and 11B are a front view and cross-sectional view of an essential portion in which a portion has been cut away representing an operation amount detection apparatus 1-9 of the ninth example.

As shown in FIGS. 11A and 11B, a transmission member 120 of the ninth example has first constituent portions 124 and 125 and second constituent portions 126 and 127. The first constituent portions 124 and 125 are connected to a first support portion 121, and the strain sensors 50a, 50b, 51a and 51b are attached thereto. The second constituent portions 126 and 127 connect the first constituent portions 124 and 125 with second support portions 122 and 123. The first constituent portion 124 and the second constituent portion 126 compose a connecting portion 128, and the first constituent portion 125 and the second constituent portion 127 compose a connecting portion 129.

The first support portion 121 and the second support portions 122 and 123 are opposed in the lengthwise direction of the pedal arm 1. A connecting hole 121a is formed in the first support portion 121. The connecting shaft 7 passes through the connecting holes 6c and 6d, the connecting hole 121a and the connecting hole 1a in the direction of plate thickness. The prescribed gap G is formed between the connecting shaft 7 and the connecting hole 1a. The second support portions 122 and 123 contact the support shafts 8 and 9 that pass through the support holes 1b and 1c of the pedal arm 1. The second support portions 122 and 123 are respectively opposed in the axial direction to the side of the input rod 5 in the axial direction of the support shafts 8 and 9, and contact the support shafts 8 and 9 in a state that allows relative rotation. The second support portions 122 and 123 are supported in the axial direction by the pedal arm 1 through the support shafts 8 and 9. An operation amount (advancing and receding operations in the axial direction) of the pedal arm 1 is respectively transmitted to the second support portions 122 and 123 through the support shafts 8 and 9.

The first constituent portions (detection portion constituent portions) 124 and 125 are arranged more on the opposite side from the side of the input rod 5 in the axial direction than the first support portion 121 and the second support portions 122 and 123, and extend in the lengthwise direction of the pedal arm 1. The first constituent portion 124 extends to one side in the lengthwise direction from the first support portion 121, and the distal end thereof opposes the second support portion 122 in the axial direction. The strain sensors 50a and 50b are attached to the first constituent portion 124 on the opposite side from the side of the input rod 5 in the axial direction. The first constituent portion 125 extends to the other side in the lengthwise direction from the first support portion 121, and the distal end thereof opposes the second support portion 123 in the axial direction. The strain sensors 51a and 51b are attached to the first constituent portion 125 on the opposite from the side of the input rod 5 in the axial direction. The second constituent portions 126 and 127 are respectively connected to the end portions of the fist constituent portions 124 and 125 on the opposite side from the side of the first support portion 121. The second constituent portion 126 connects the first constituent portion 124 and the second support portion 122 in the axial direction, while the second constituent portion 127 connects the first constituent portion 125 and the second support portion 123 in the axial direction. The second constituent portions 126 and 127 are formed in to the shape of the letter U, with one end connected to the first constituent portions 124 and 125 and the other end connected to the second support portions 122 and 123.

The second constituent portion 126 (127) is a turnaround portion constituent portion having a turnaround portion that is turned around from one portion to another portion in the lengthwise direction of the pedal arm 1. The second constituent portion 126 (127) extends in a direction perpendicular to the axial direction, and has a pair of members 126a and 126b (127a and 127b) in which deflection occurs in the axial direction due to a load that acts during transmission of an operation amount. The members 126a and 126b are connected in series to the members 127a and 127b and form U-shaped turnaround portions as a result of being curved and connected. The turnaround portions of the second constituent portions 126 and 127 are curved towards the side of the first support portion 121 in the lengthwise direction of the pedal arm 1.

When an operation amount is input from the pedal arm 1 to the second support portions 122 and 123 through the support shafts 8 and 9, the pair of members 126a and 126b of the second constituent portion 126 and the first constituent portion 124 deflect so that both of their respective end portions are relatively displaced in the axial direction of the input rod 5. Similarly, the first constituent portion 125 and the pair of members 127a and 127b of the second constituent portion 127 also deflect so that both of their respective end portions are relatively displaced in the axial direction of the input rod 5. In this manner, by having a plurality of members in which deflection occurs in the axial direction during transmission of an operation amount, the amount of deflection in the axial direction between the first constituent portion 121 and the second constituent portions 122 and 123 can be made to be large.

In particular, as a result of employing a turnaround structure for the second constituent portions 126 and 127, the regions where the opposing members 126a and 126b are arranged overlap in a direction perpendicular to the axial direction, and the regions where the opposing members 127a and 127b are arranged overlap in a direction perpendicular to the axial direction. As a result, size in the direction perpendicular to the axial direction (lengthwise direction of the pedal arm 1) can be inhibited from increasing while making it possible to extend the total length of those members in which deflection occurs in the axial direction.

In addition, the second support portions 122 and 123 are able to rotate relative to the support shafts 8 and 9 while being supported by the support shafts 8 and 9 in the axial direction. In other words, the members 126a and 127a connected to the second support portions 122 and 123 are able to rotate while being supported by the second support portions 122 and 123. Accordingly, the amount of relative displacement in the axial direction between the first support portion 121 and the second support portions 122 and 123 can be increased corresponding to an operation amount.

As a result, relative displacement in the axial direction between the first support portion 121 and the second support portions 122 and 123 can be increased for a prescribed operation amount while securing strength of the transmission member 120. Accordingly, both securing strength of the transmission member 120 and inhibiting the transmission member 120 from becoming excessively large can be realized.

In addition, similar to the sixth and other examples, the shapes (deformation characteristics) of the first constituent portions 124 and 125 and the shapes (deformation characteristics) of the second constituent portions 126 and 127 can be set mutually independently. For example, a large amount of deflection in the axial direction can be secured by the second constituent portions 126 and 127 provided with turnaround portions while increasing the amount of strain of the first constituent portions 124 and 125 (to improve detection sensitivity of an operation amount by detecting strain in a high strain region). In this manner, the setting degree of freedom of the transmission member 120 can be increased thereby improving SN ratio.

TENTH EXAMPLE

Figure 12A:
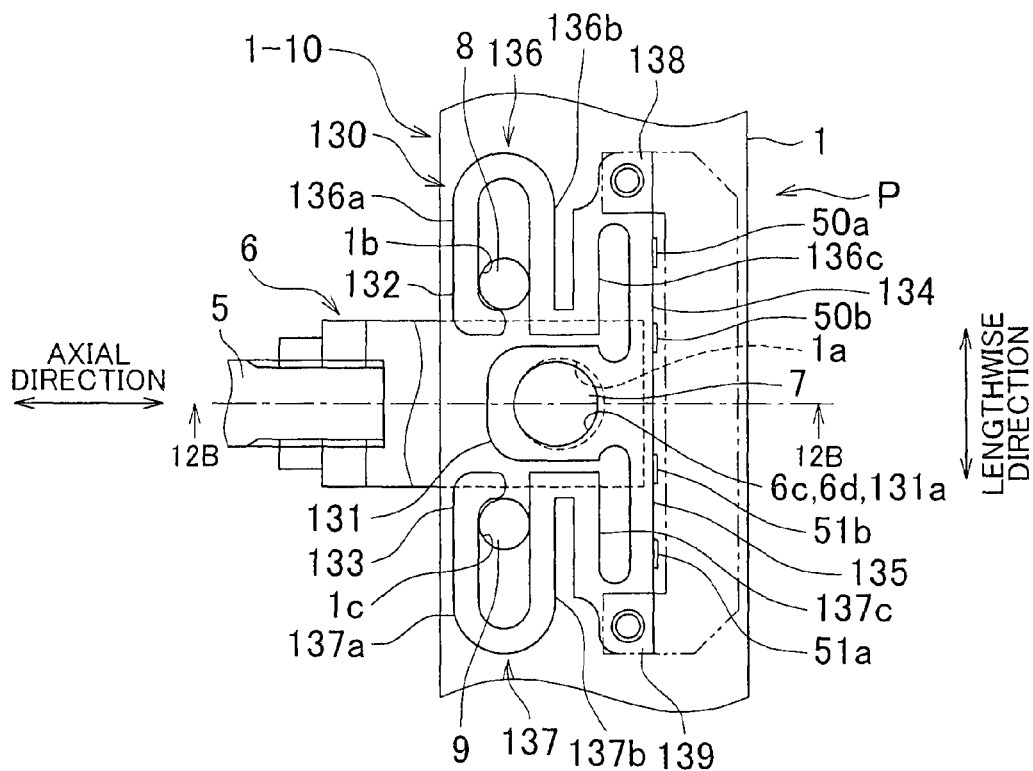
FIGS. 12A and 12B are a front view and cross-sectional view of an operation amount detection apparatus relating to a tenth example.
Figure 12B:
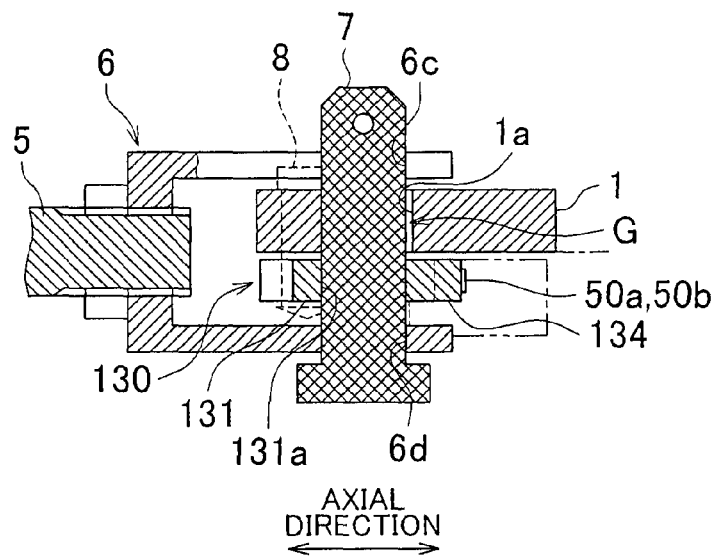

The following provides an explanation of a tenth example with reference to FIGS. 12A and 12B. The same reference symbols are used to indicate those members of the tenth example that have the same functions as those explained in the above-mentioned examples, and duplicate explanations thereof are omitted. FIGS. 12A and 12B are a front view and cross-sectional view of an essential portion in which a portion has been cut away representing an operation amount detection apparatus 1-10 of the tenth example.

The tenth example differs from the ninth example in that second constituent portions 132 and 133 and the support shafts 8 and 9 are arranged so that first constituent portions (prescribed constituent portions, detection portion constituent portions) 134 and 135 are curved into the shape of the letter S. As shown in FIGS. 12A and 12B, in a transmission member 130, a first support portion 131 and the first constituent portions 134 and 135 can respectively have roughly the same configurations as the first support portion 121 and the first constituent portions 124 and 125 of the ninth example. The strain sensors 50a and 50b are attached to the first constituent portion 134 on the opposite side from the side of the input rod 5 in the axial direction, while the strain sensors 51a and 51b are attached to the first constituent portion 135 on the opposite side from the side of the input rod 5 in the axial direction. The strain sensors 50b and 51b are respectively arranged more to the side of the first support portion 131 than the strain sensors 50a and 51a. The support shafts 8 and 9 are arranged on the one side and the other side of the connecting shaft 7 in the lengthwise direction of the pedal arm 1, and are arranged more to the side of the input rod 5 in the axial direction than the connecting shaft 7. Corresponding thereto, the second support portions 132 and 133 are arranged on one side and the other side in the lengthwise direction of the pedal arm 1 interposing the first support portion 131. The connecting shaft 7 passes through the connecting holes 6c and 6d, the connecting hole 1a and a connecting hole 131a formed in the first support portion 131 in the direction of plate thickness. The prescribed gap G is formed between the connecting shaft 7 and the connecting hole 1a.

The second support portions 132 and 133 contact the support shafts 8 and 9 that pass through the support holes 1b and 1c of the pedal arm 1. The second support portions 132 and 133 respectively oppose the support shafts 8 and 9 in the axial direction on the side of the input rod 5 in the axial direction, and contact the support shafts 8 and 9 in a state that allows relative rotation. The second support portions 132 and 133 are supported in the axial direction by the pedal arm 1 through the support shafts 8 and 9. An operation amount (advancing and receding operations in the axial direction) of the pedal arm 1 is respectively transmitted to the second support portions 132 and 133 through the support shafts 8 and 9.

The second support portions 132 and 133 and the first constituent portions (connecting portions) 134 and 135 are respectively connected by second constituent portions (connecting portions) 136 and 137. A connecting portion between the second support portion 132 and the support shaft 8 is offset from a connecting portion 138 between the second constituent portion 136 and the first constituent portion 134 to the side of the first support portion 131 in the lengthwise direction of the pedal arm 1. Similarly, a connecting portion between the second support portion 133 and the support shaft 9 is offset from a connecting portion 139 between the second constituent portion 137 and the first constituent portion 135 to the side of the first support portion 131 in the lengthwise direction of the pedal arm 1. As a result, when an operation amount is transmitted from the pedal arm 1 to an operation target member, the first constituent portions 134 and 135 respectively curve into the shape of the letter S in the transmission member 130. The first constituent portions 134 and 135 curve into the shape of the letter S so that the strain sensors 50a and 51a bend in the direction in which they are compressed together while the strain sensors 50b and 51b bend in the direction in which they are pulled apart. As a result, detection accuracy of an operation amount can be improved by eliminating detection error attributable to thermal expansion and the like of the first constituent portions 134 and 135.

In addition, similar to the second constituent portion 126 (127) of the ninth example, the second constituent portion 136 (137) extends in a direction perpendicular to the axial direction. The second constituent portion 136 (137) has members 136a, 136b and 136c (137a, 137b and 137c) in which deflection occurs in the axial direction due to a load that acts during transmission of an operation amount, and this plurality of members are connected in series (multiple stages) in a turnaround shape. Accordingly, the amount of relative displacement in the axial direction between the first support portion 131 and the second support portions 132 and 133 during transmission of an operation amount can be increased. In addition, at least one of the regions where the members 136a, 136b and 136c are respectively arranged overlaps with another region in which they are arranged in a direction that is perpendicular to the axial direction. Preferably, any of the regions where the members 136a, 136b and 136c are arranged also respectively overlaps with two other regions in which they are arranged. This applies similarly to the regions in which the members 137a, 137b and 137c are arranged in the second constituent portion 137. According to the operation amount detection apparatus 1-10 of the tenth example, both securing strength of the transmission member 130 and inhibiting the transmission member 130 from becoming excessively large can be realized.

ELEVENTH EXAMPLE

Figure 13A:
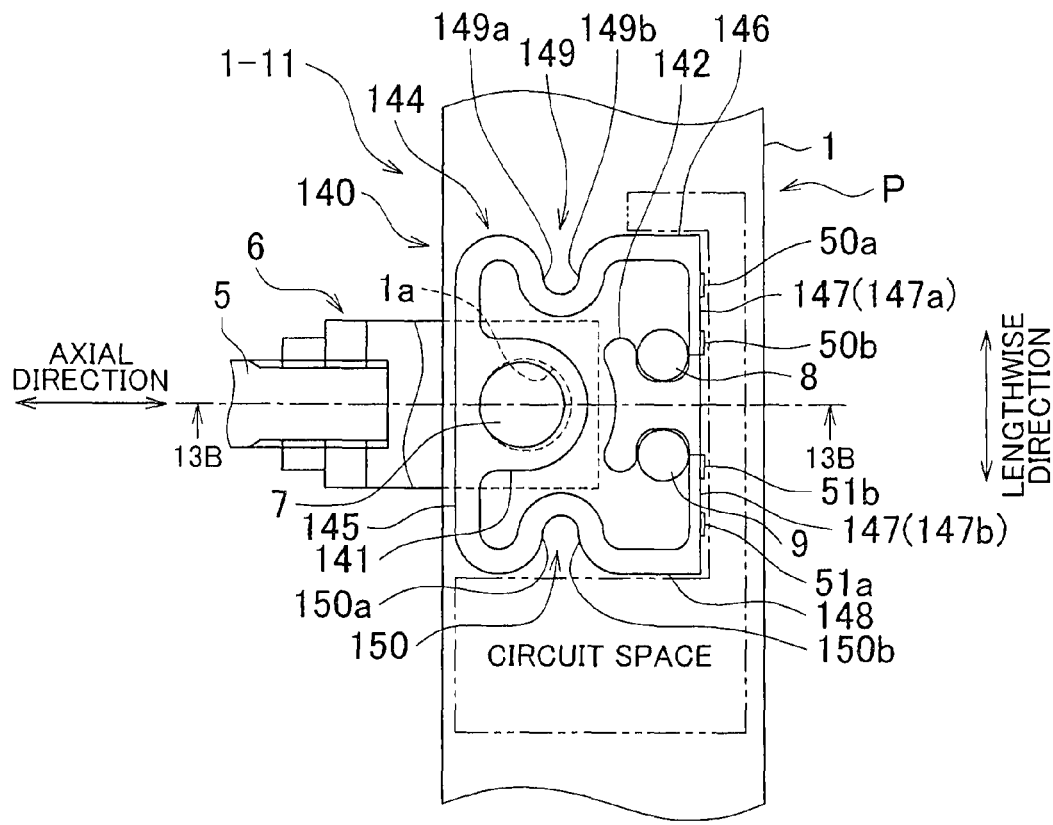
FIGS. 13A and 13B are a front view and cross-sectional view of an operation amount detection apparatus relating to an eleventh example.
Figure 13B:
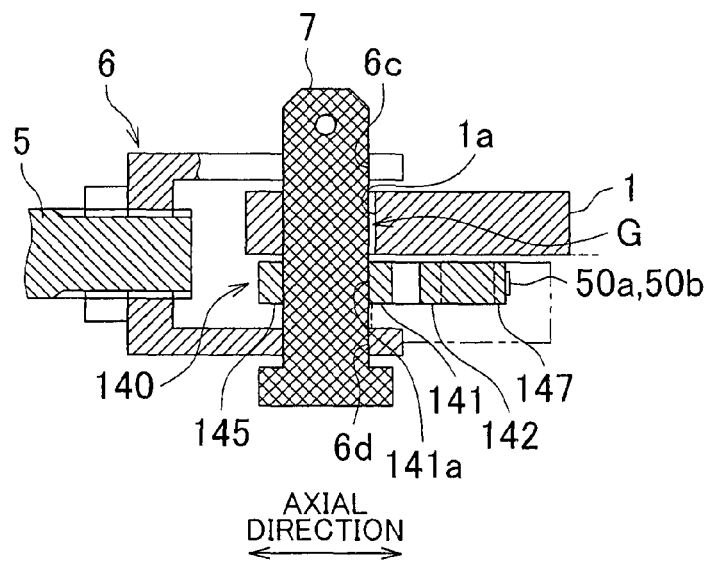

The following provides an explanation of an eleventh example with reference to FIGS. 13A and 13B. The same reference symbols are used to indicate those members of the eleventh example that have the same functions as those explained in the above-mentioned examples, and duplicate explanations thereof are omitted. FIGS. 13A and 13B are a front view and cross-sectional view of an essential portion in which a portion has been cut away representing an operation amount detection apparatus 1-11 of the eleventh example.

As shown in FIGS. 13A and 13B, in a transmission member 140 of the eleventh example, a connecting portion 144 is formed into the shape of a frame and the connecting portion 144 is provided with a turnaround shape. As a result, rigidity is secured and the amount of deflection in the axial direction attributable to transmission of an operation amount can be increased.

A first support portion 141, a second support portion 142, a first constituent portion 145 and a third constituent portion 147 of the transmission member 140 can respectively be configured in the same manner as the first support portion 111, the second support portion 112, the first constituent portion 115 and the third constituent portion 117 of the eighth example (FIG. 10A).

A second constituent portion (both end constituent portion) 146 extends in the axial direction and connects one end of the first constituent portion 145 and one end of the third constituent portion 147. A fourth constituent portion (both end constituent portion) 148 extends in the axial direction and connects the other end of the first constituent portion 145 and the other end of the third constituent portion 147. In this manner, the connecting portion 144 is configured in the shape of a frame. The strain sensors 50a, 50b, 51a and 51b are arranged in the same manner as the arrangement in the third constituent portion 117 of the eighth example and are attached to the third constituent portion 147. Similar to the eighth example, when an operation amount is input from the pedal arm 1 to the second constituent portion 142 through the support shafts 8 and 9, one side (147a) and the other side (147b) of the third constituent portion 147 more in the lengthwise direction than the second support portion 142 respectively curve into the shape of the letter S. As a result, the detection accuracy of an operation amount can be improved by eliminating detection error attributable to thermal expansion and the like of the third constituent portion 147.

In addition, turnaround portions 149 and 150 are respectively formed in the second constituent portion 146 and the fourth constituent portion 148. As a result of providing the turnaround portions 149 and 150, members are formed in the shape of beams in which deflection occurs in the axial direction due to transmission of an operation amount and in which portions in which they are arranged in a direction perpendicular to the axial direction mutually overlap (represented by reference symbols 149a, 149b, 150a and 150b). Accordingly, when increasing the amount of deflection of the transmission member 140 in the axial direction, both securing strength of the transmission member 140 and inhibiting the transmission member 140 from becoming excessively large can be realized. The transmission member 140 is fabricated by, for example, press forming. As a result of making the transmission member 140 to have the shape of a frame, the thickness of the beams can be reduced without decreasing rigidity of the transmission member 140 that is a plate member, thereby making it possible to reduce the size of the transmission member 140.

In the connecting portion 144 of the operation amount detection apparatus 1-11 of the eleventh example, members in which deflection occurs due to transmission of an operation amount are arranged in multiple stages in series and a plurality are arranged in parallel between the first support portion 141 and the second support portion 142. As a result, both securing of strength and inhibition of increases in size can be maximally realized.

TWELFTH EXAMPLE

Figure 14A:
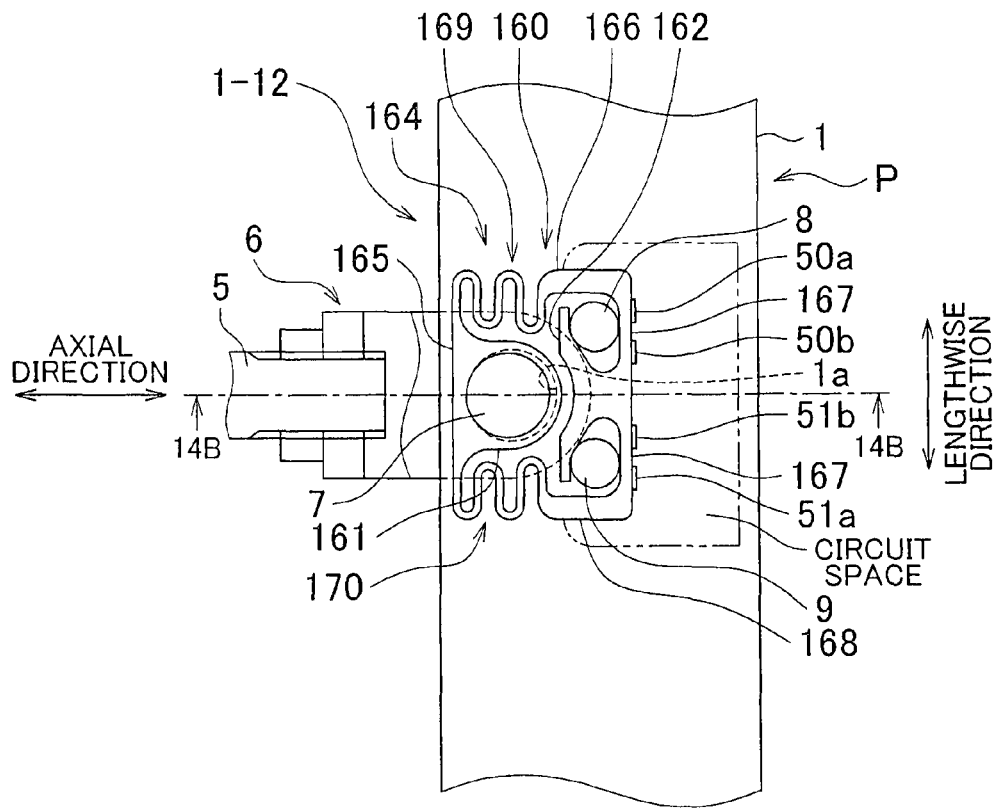
FIGS. 14A and 14B are a front view and cross-sectional view of an operation amount detection apparatus relating to a twelfth example.
Figure 14B:
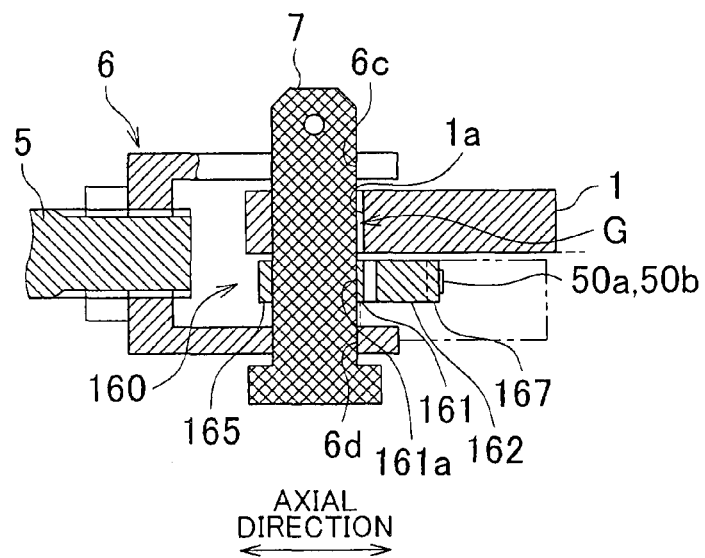

The following provides an explanation of a twelfth example with reference to FIGS. 14A and 14B. The same reference symbols are used to indicate those members of the twelfth example that have the same functions as those explained in the above-mentioned examples, and duplicate explanations thereof are omitted. FIGS. 14A and 14B are a front view and cross-sectional view of an essential portion in which a portion has been cut away representing an operation amount detection apparatus 1-12 of the twelfth example.

As shown in FIGS. 14A and 14B, in a transmission member 160 of the twelfth example, turnaround portions that are turned around a plurality of times into a bellows shape are respectively provided in a second constituent portion 166 and a fourth constituent portion 168 that connect a first constituent portion 165 and a third constituent portion 167. As a result of providing the turnaround portions that are turned around a plurality of times, the amount of deflection in the axial direction of the transmission member 160 can be adjusted without increasing the overall size of the transmission member 160.

A first support portion 161, a second support portion 162 and the first constituent portion 165 and the third constituent portion 167 of a connecting portion 164 can respectively be configured in the same manner as the first support portion 111, the second support portion 112, the first constituent portion 115 and the third constituent portion 117 of the eighth example.

In the connecting portion 164, the second constituent portion 166 connects one end of the first constituent portion 165 and one end of the third constituent portion 167 in the axial direction, while the fourth constituent portion 168 connects the other end of the first constituent portion 165 and the other end of the third constituent portion 167 in the axial direction. In this manner, the connecting portion 164 is configured in the shape of a frame. The strain sensors 50a, 50b, 51a and 51b are attached to the third constituent portion 167 in the same arrangement as the arrangement in the third constituent portion 117 of the eighth example.

Turnaround portions 169 and 170 are respectively provided in the second constituent portion 166 and the fourth constituent portion 168. The turnaround portions 169 and 170 are turned around a plurality of times into the shape of bellows, and U-shaped curved portions facing to one side in the lengthwise direction of the pedal arm 1 and U-shaped curved portions facing to the other side are alternately and repeatedly formed in the axial direction. In this manner, as a result of causing the second constituent portion 166 and the fourth constituent portion 168 to turn around a plurality of times in the turnaround portions 169 and 170, the number of members in which deflection occurs in the axial direction during transmission of an operation amount can be increased, the amount of deflection in the axial direction of the transmission member 160 between the first support portion 161 and the second support portion 162 can be increased. Furthermore, the number and shape of the turnarounds in the turnaround portions 169 and 170 are not limited to those shown in FIGS. 14A and 14B.

Since the operation for detecting an operation amount is the same as that of the first example, and since the action of curving the third constituent portion 167 into the shape of the letter S when detecting an operation amount is the same as that of the eleventh example, explanations thereof are omitted.

Furthermore, in each of the above-mentioned examples, the amount of defection of a transmission member was increased by arranging members functioning as springs in multiple stages in series and in parallel. Other amounts of deformation of the transmission member (such as elongation and contraction) may be increased instead.

The invention claimed is:

1. An operation amount detection apparatus that detects an operation amount transmitted from a shaft portion rotatably supported and extending in a radial direction of the rotation to an operation target member to which rotational motion of the shaft portion is input after being converted to a linear motion, between an operation member having the shaft portion and the operation target member, comprising:
   a transmission member that includes a first support portion that is supported by the operation target member, a second support portion that is arranged at a different location of the shaft portion from the first support portion and is supported by the shaft portion, and a connecting portion that connects the first support portion and the second support portion and deflects due to transmission of a load so that the first support portion and the second support portion are relatively displaced in a direction of the linear motion, wherein the transmission member transmits a load corresponding to the operation amount between the shaft portion and the operation target member through the connecting portion; and a detection device that detects the operation amount based on an amount of deformation of the connecting portion caused by transmission of the load;

wherein:

the second support portion is arranged at a different location in a lengthwise direction of the shaft portion from the first support portion;

wherein the connecting portion includes a plurality of connecting portions, wherein the plurality of connecting portions connect the first support portion and the second support portion, and deflect due to transmission of the load so that the first support portion and the second support portion are relatively displaced in the direction of the linear motion, and the transmission member transmits the load corresponding to the operation amount between the shaft portion and the operation target member through the connection portions;

wherein the detection device detects the operation amount based on the plurality of connecting portions; and wherein the plurality of connecting portions are arranged in parallel between the first support portion and the second support portion and are mutually opposed in a direction that is perpendicular to the lengthwise direction of the shaft portion.

2. The operation amount detection apparatus according to claim 1, wherein the plurality of connecting portions are arranged on one side and the other side in the direction of the linear motion of the first support portion and the second support portion, and the connecting portion arranged on one side of the linear motion and the connecting portion arranged on the other side of the linear motion are formed to have a shape such that amounts of deformation thereof per unit transmitted load are equal to each other.

3. The operation amount detection apparatus according to claim 1, wherein the first support portion and the second support portion are formed of a pair of plate members opposing each other in an axial direction of the rotation so as to interpose the shaft portion, the pair of plate members are formed to have U-shaped cross-sections mutually connected at one end portion in the direction of the linear motion, and the connecting portions connect the first support portion and the second support portion at both ends respectively in the direction of the linear motion.

4. An operation amount detection apparatus that detects an operation amount transmitted from a shaft portion rotatably supported and extending in a radial direction of the rotation to an operation target member to which rotational motion of the shaft portion is input after being converted to a linear motion, between an operation member having the shaft portion and the operation target member, comprising:

a transmission member that includes a first support portion that is supported by the operation target member, a second support portion that is supported by the shaft portion, and a connecting portion that connects the first support portion and the second support portion and deflects due to transmission of a load so that the first support portion and the second support portion are relatively displaced in a direction of the linear motion, wherein the transmission member transmits a load corresponding to the operation amount between the shaft portion and the operation target member through the connecting portion; and a detection device that detects the operation amount based on an amount of deformation of the connecting portion caused by transmission of the load;

wherein:

the connecting portion includes a plurality of connecting portions, the plurality of connecting portions connect the first support portion and the second support portion, and deflect due to transmission of the load so that the first support portion and the second support portion are relatively displaced in the direction of the linear motion, and the transmission member transmits the load corresponding to the operation amount between the shaft portion and the operation target member through the connection portions;

wherein the detection device detects the operation amount based on the plurality of connecting portions; and wherein the plurality of connecting portions are connected in series on a load transmission path between the first support portion and the second support portion, and have a plurality of curved and connected constituent portions.

5. The operation amount detection apparatus according to claim 4, wherein the connecting portions have a pair of the constituent portions in mutual opposition in the direction of the linear motion.

6. The operation amount detection apparatus according to claim 5, wherein the connecting portions are formed into a U shape that protrudes in a direction moving away from the first support portion and the second support portion in a lengthwise direction of the shaft portion, and the constituent portion connected to the first support portion and the constituent portion connected to the second support portion are mutually opposed in the direction of the linear motion.

7. The operation amount detection apparatus according to claim 6, wherein the connection portions are respectively provided on both sides in the lengthwise direction of the shaft portion with the first support portion and the second support portion interposed therebetween, a plurality of the detection devices are provided along the lengthwise direction of the shaft portion for the constituent portions connected to the first support portion in each of the connecting portions, and end portions on the opposite side from the first support portion of the constituent portions provided with the detection devices are mutually connected by a member different from the constituent portions.

8. The operation amount detection apparatus according to claim 5, wherein the pair of constituent portions are mutually connected by both end constituent portions that extend in the lengthwise direction of the shaft portion and are the constituent portions that extend in the direction of the linear motion at the both ends, the first support portion is connected to a central portion of one of the pair of constituent portions in the lengthwise direction of the shaft portion, and the second support portion is connected to a central portion of the other of the pair of constituent portions in the lengthwise direction of the shaft portion.

9. The operation amount detection apparatus according to claim 4, wherein the connecting portions have a turnaround portion that is turned around from one portion to another portion in a direction perpendicular to the direction of the linear motion.

10. The operation amount detection apparatus according to claim 9, wherein the connecting portions have a detection portion constituent portion that is connected to the first support portion, extends in the lengthwise direction of the shaft portion, and is the constituent portion provided with the detection apparatus, and a turnaround portion constituent portion that connects the detection portion constituent portion and the second support portion in the direction of the linear motion and is the constituent portion provided with the turnaround portion, and the turnaround portion is curved towards the first support portion in the lengthwise direction of the shaft portion.

11. The operation amount detection apparatus according to claim 9, wherein the pair of constituent portions are mutually connected by both end constituent portions that extend in the lengthwise direction of the shaft portion and are the constituent portions that extend in the direction of the linear motion at the both ends, the first support portion is connected to the other of the pair of constituent portions, and the turnaround portion is provided in the both end constituent portions.

12. The operation amount detection apparatus according to claim 4, wherein the detection device is provided in a prescribed constituent portion that is the constituent portion extending in a direction perpendicular to the direction of the linear motion, the first support portion and the second support portion are respectively supported by the shaft portion and operation target member so that a moment that causes curvature in mutually different directions on one side and the other side in the perpendicular direction of the prescribed constituent portion acts due to the transmission of a load, and the detection device detects the operation amount based on respective amounts of deformation on one side and the other side in the perpendicular direction of the prescribed constituent portion.

13. The operation amount detection apparatus according to claim 12, wherein the prescribed constituent portion is a detection portion constituent portion that is connected to the first support portion, extends in the lengthwise direction of the shaft portion, and is the constituent portion provided with the detection device, an end portion of the detection portion constituent portion on the opposite side from the side where the first support portion is connected is connected to the second support portion through the constituent portion that differs from the detection portion constituent portion, and the second support portion is arranged closer to the side of the first support portion in the lengthwise direction of the shaft portion than the end portion of the detection portion constituent portion on the opposite side from the side where the first support portion is connected.

14. The operation amount detection apparatus according to claim 1, wherein the shaft portion has a U-shaped cross-section that is perpendicular to the lengthwise direction, and the transmission member is arranged in a space inside the U shape.

15. The operation amount detection apparatus according to claim 1, wherein when deflection in which the relative displacement becomes a prescribed amount occurs in the connecting portions, the connecting portions further
transmit a load without going through the transmission member by causing the shaft portion side and the operation target member side to make contact.

16. The operation amount detection apparatus according to claim 4, wherein the shaft portion has a U-shaped cross-section that is perpendicular to the lengthwise direction, and the transmission member is arranged in a space inside the U shape.

17. The operation amount detection apparatus according to claim 4, wherein when deflection in which the relative displacement becomes a prescribed amount occurs in the connecting portions, the connecting portions further transmit a load without going through the transmission member by causing the shaft portion side and the operation target member side to make contact.

* * * * *